United States Patent
Okada et al.

(10) Patent No.: US 10,788,653 B2
(45) Date of Patent: Sep. 29, 2020

(54) IMAGING LENS AND IMAGING APPARATUS

(71) Applicant: FUJIFILM Corporation, Tokyo (JP)

(72) Inventors: Kazuyoshi Okada, Saitama (JP); Takashi Kunugise, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 134 days.

(21) Appl. No.: 16/130,141

(22) Filed: Sep. 13, 2018

(65) Prior Publication Data
US 2019/0086651 A1    Mar. 21, 2019

(30) Foreign Application Priority Data
Sep. 19, 2017    (JP) .................... 2017-178516

(51) Int. Cl.
*G02B 13/22* (2006.01)
*G02B 27/00* (2006.01)
*G02B 15/14* (2006.01)
*G02B 13/00* (2006.01)

(52) U.S. Cl.
CPC ......... *G02B 13/22* (2013.01); *G02B 13/0045* (2013.01); *G02B 15/14* (2013.01); *G02B 27/0025* (2013.01)

(58) Field of Classification Search
CPC .......... G02B 13/02; G02B 13/22; G02B 9/12; G02B 9/34; G02B 9/60; G02B 9/62; G02B 9/64; G02B 13/0045; G02B 27/0025
See application file for complete search history.

(56) References Cited

U.S. PATENT DOCUMENTS

| 6,178,049 B1 * | 1/2001 | Mukaiya | G02B 15/173 359/683 |
| 2004/0051960 A1 * | 3/2004 | Mihara | G02B 13/0045 359/686 |
| 2008/0137211 A1 | 6/2008 | Kawakami et al. | |
| 2012/0075729 A1 | 3/2012 | Uemura | |

(Continued)

FOREIGN PATENT DOCUMENTS

| JP | 2008-145801 A | 6/2008 |
| JP | 2012-068448 A | 4/2012 |

(Continued)

OTHER PUBLICATIONS

An Office Action; "Notification of Reasons for Refusal," mailed by the Japanese Patent Office dated Apr. 7, 2020, which corresponds to Japanese Patent Application No. 2017-178516 and is related to U.S. Appl. No. 16/130,141 with English language translation.

*Primary Examiner* — Jordan M Schwartz
(74) *Attorney, Agent, or Firm* — Studebaker & Brackett PC

(57) ABSTRACT

The imaging lens consists of, in order from the object side, a positive first lens group that has a positive refractive power and remains stationary during focusing, and a second lens group that moves toward an image side during focusing from a distant object to a close-range object. The first lens group has, successively in order from a position closest to the image side, a first-b sub-lens group having a positive refractive power, and an aperture stop. The imaging lens satisfies predetermined conditional expressions relating to the first-b sub-lens group, the second lens group, and the like.

15 Claims, 17 Drawing Sheets

(56) References Cited

U.S. PATENT DOCUMENTS

| | | | |
|---|---|---|---|
| 2012/0113527 A1* | 5/2012 | Horiuchi | G02B 13/18 |
| | | | 359/687 |
| 2014/0153118 A1 | 6/2014 | Onozaki | |
| 2016/0147041 A1* | 5/2016 | Sato | G02B 9/64 |
| | | | 359/740 |
| 2017/0090150 A1* | 3/2017 | Naruse | G02B 9/64 |

FOREIGN PATENT DOCUMENTS

| | | |
|---|---|---|
| JP | 2014-109711 A | 6/2014 |
| JP | 2016-099543 A | 5/2016 |
| JP | 2017-037342 A | 2/2017 |

\* cited by examiner

FIG. 1
EXAMPLE 1
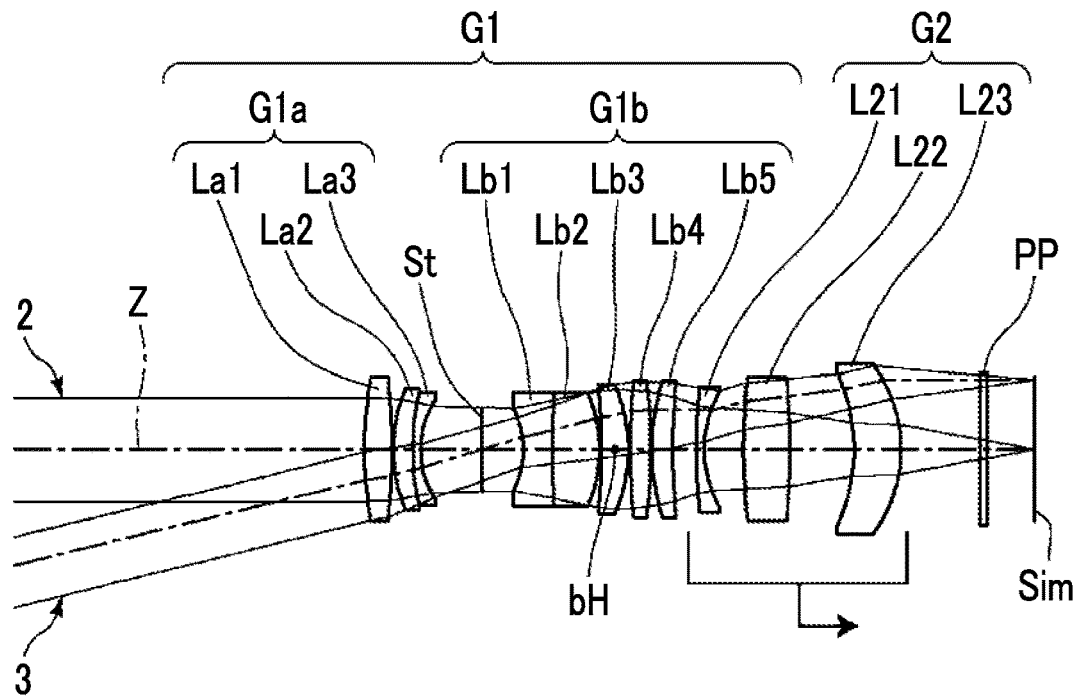
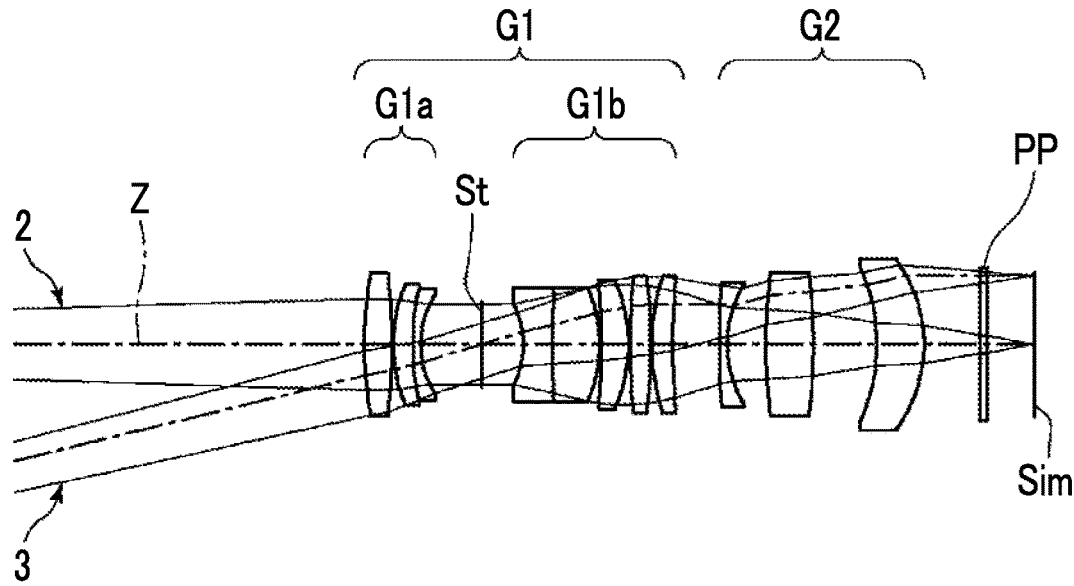

FIG. 3
EXAMPLE 2
INFINITY
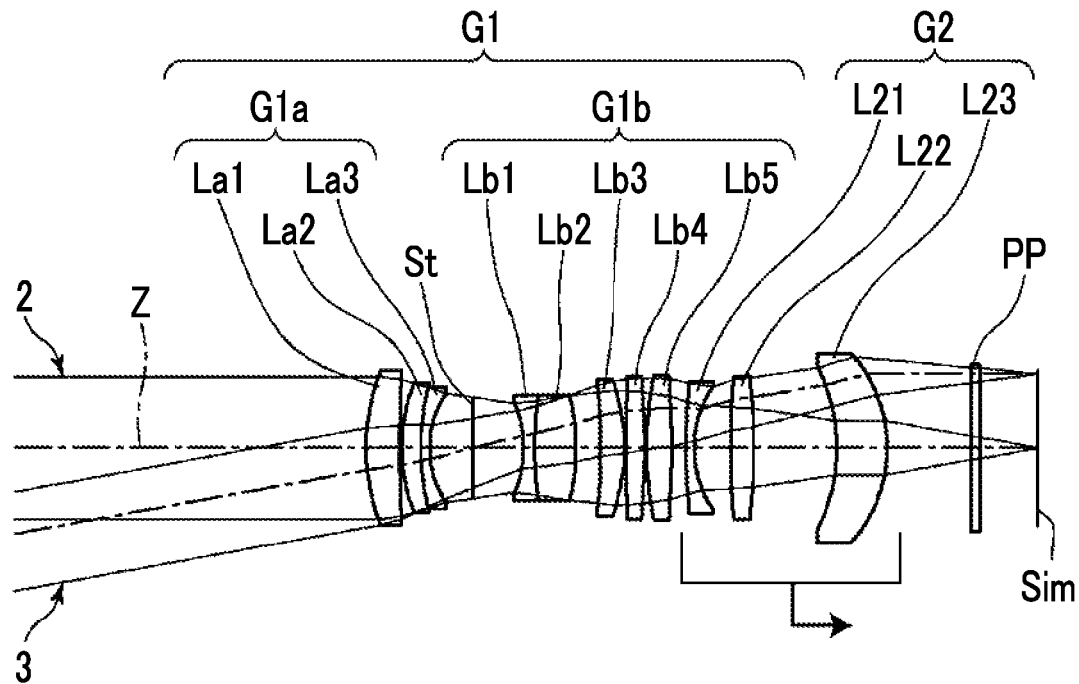
0.2m
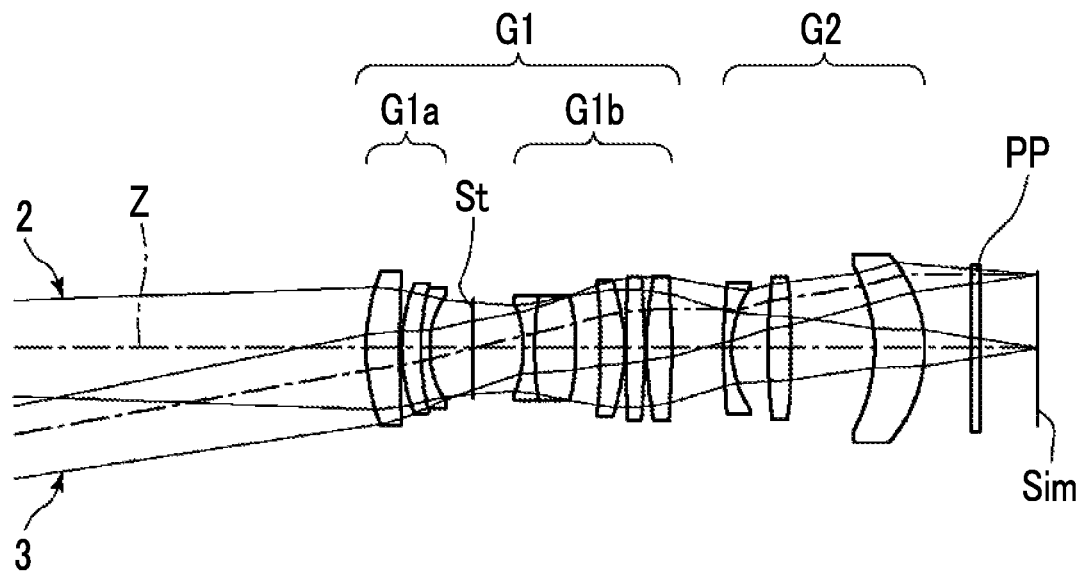

FIG. 4
EXAMPLE 3
INFINITY
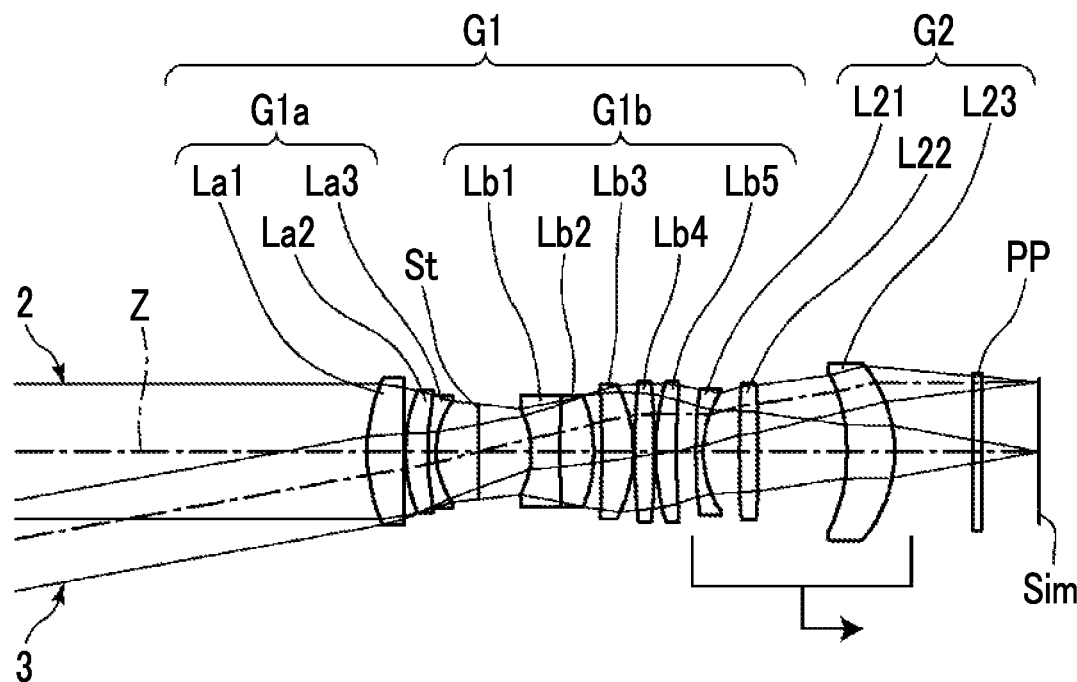
0.2m
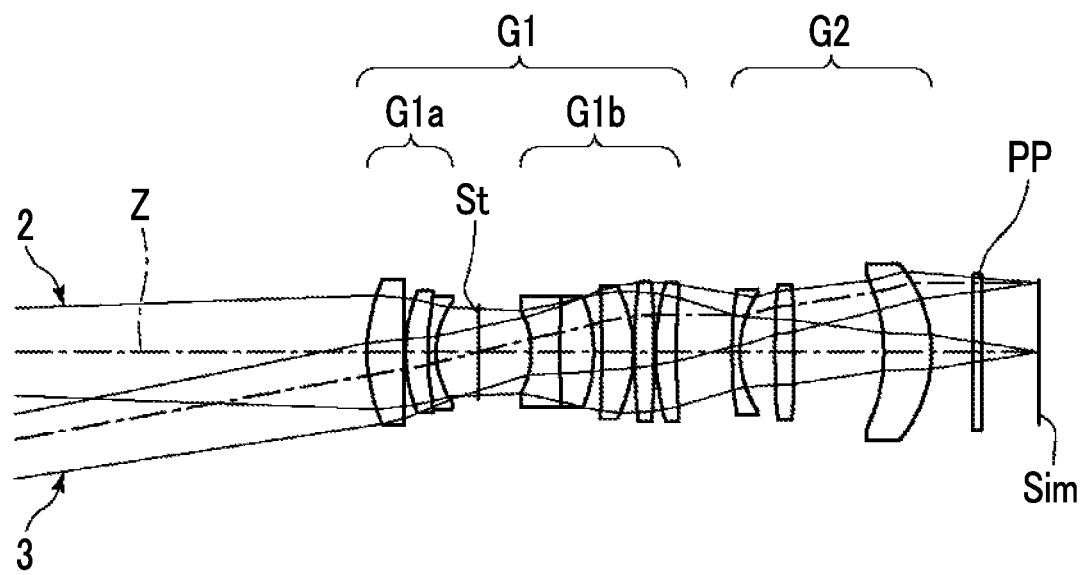

FIG. 5
EXAMPLE 4
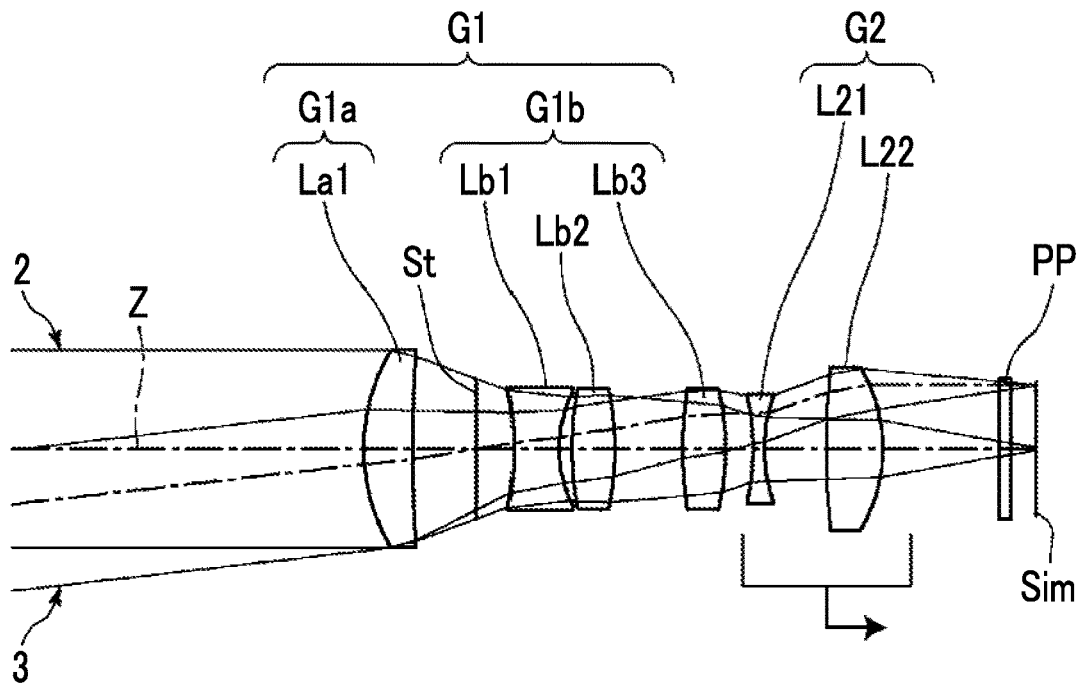
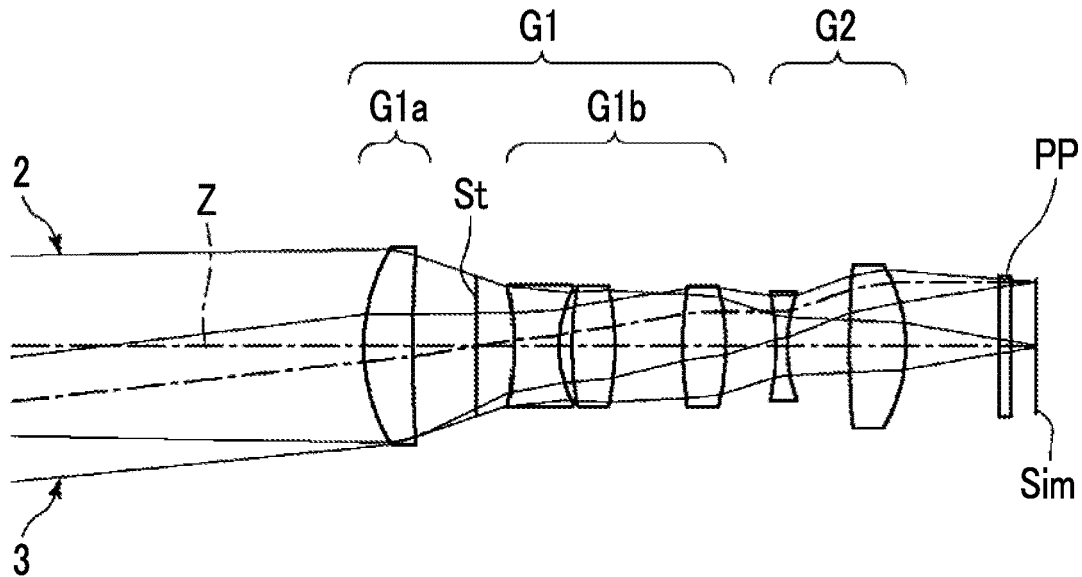

FIG. 6
EXAMPLE 5
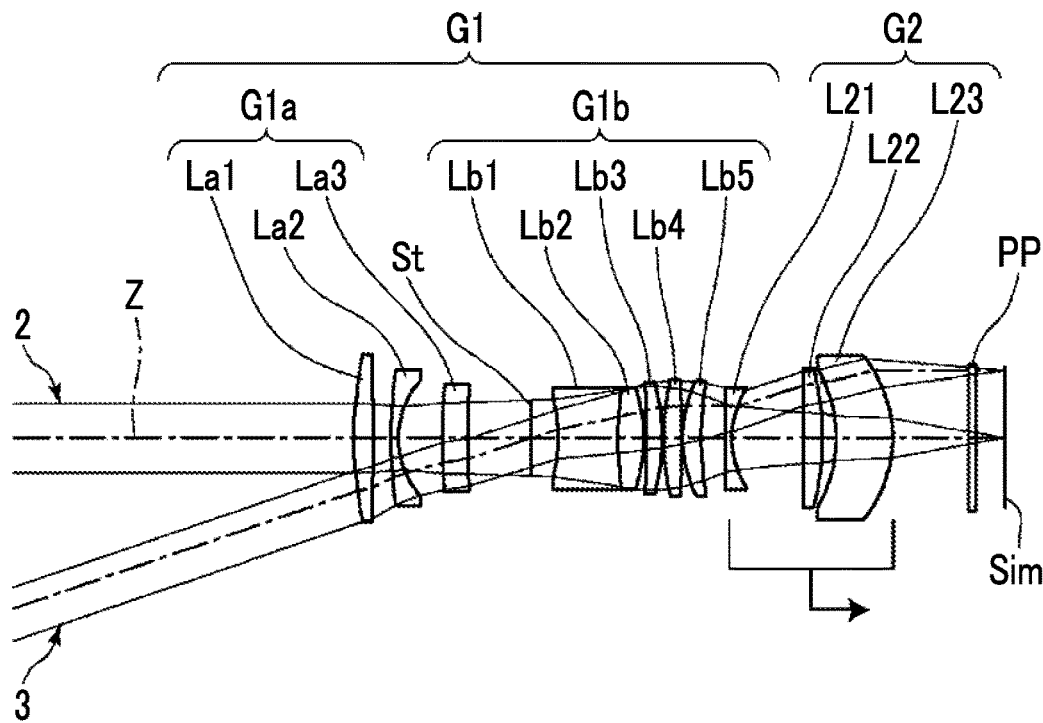
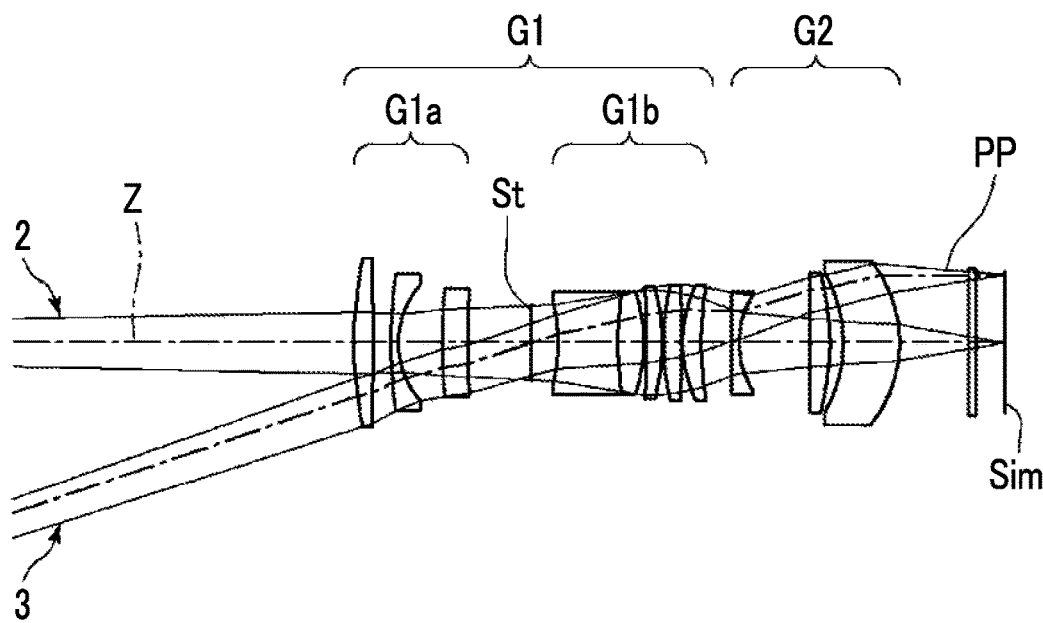

FIG. 7
EXAMPLE 6
INFINITY
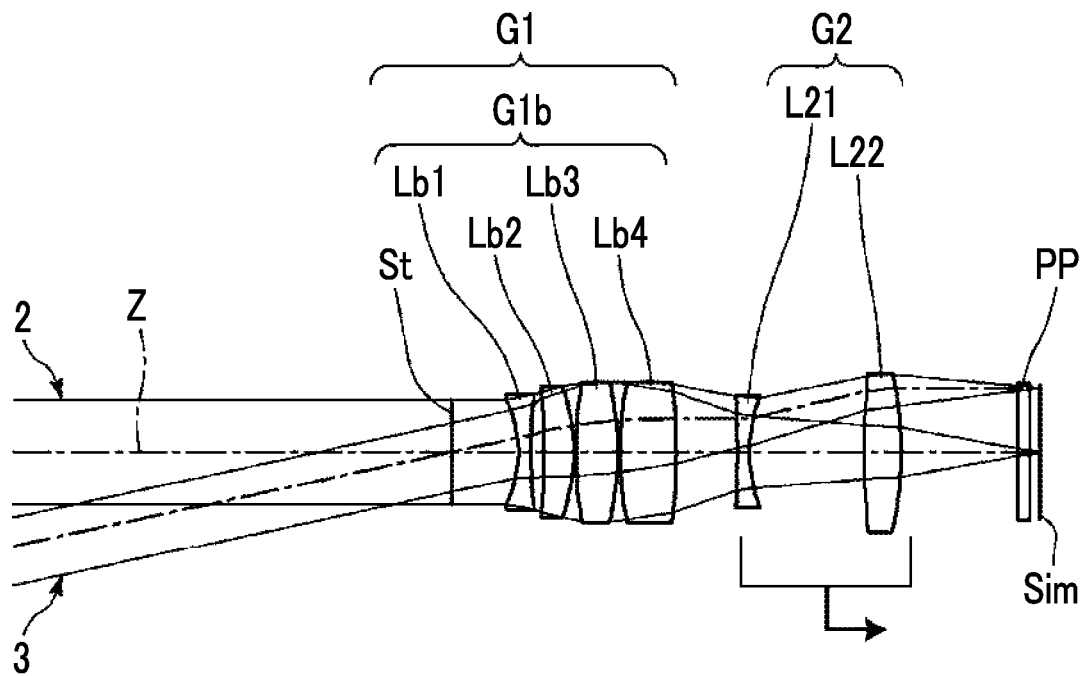
0.5m
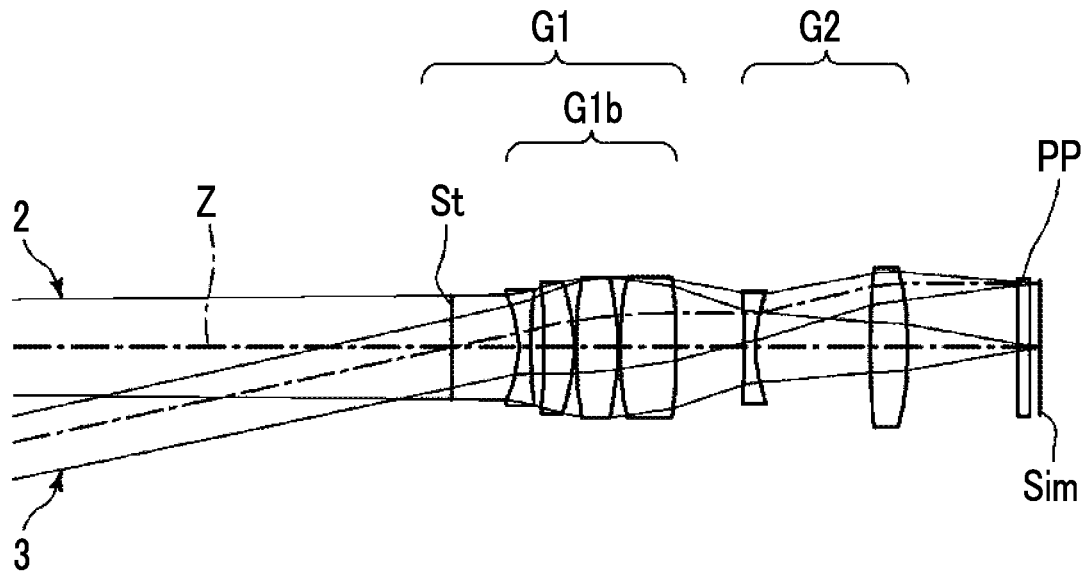

FIG. 8
EXAMPLE 7
INFINITY
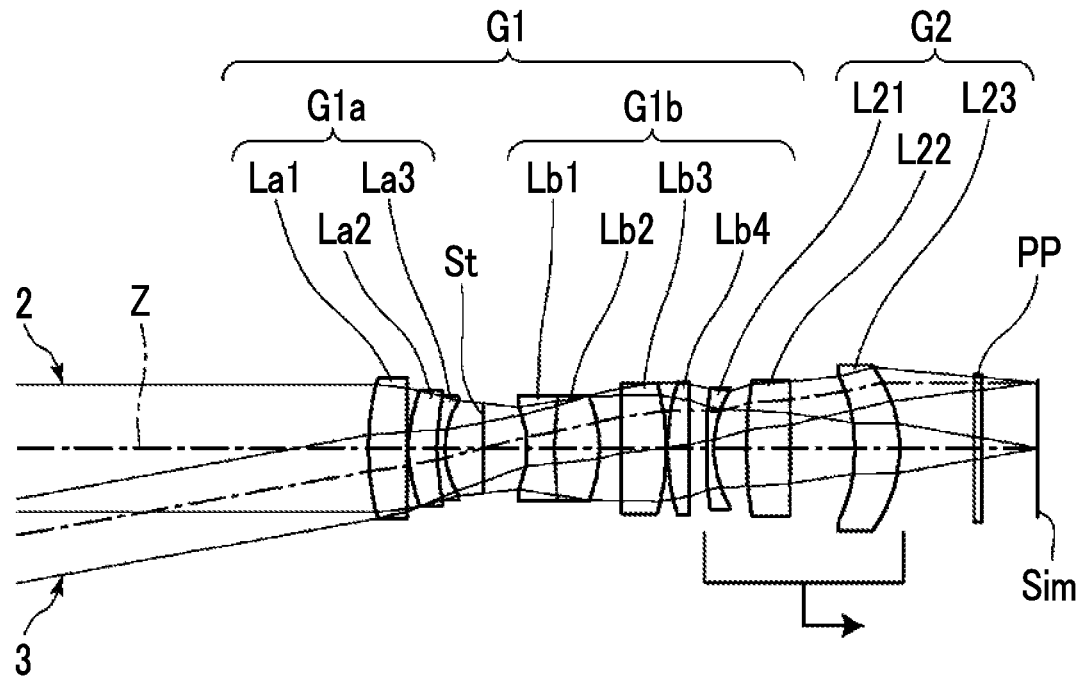
0.2m
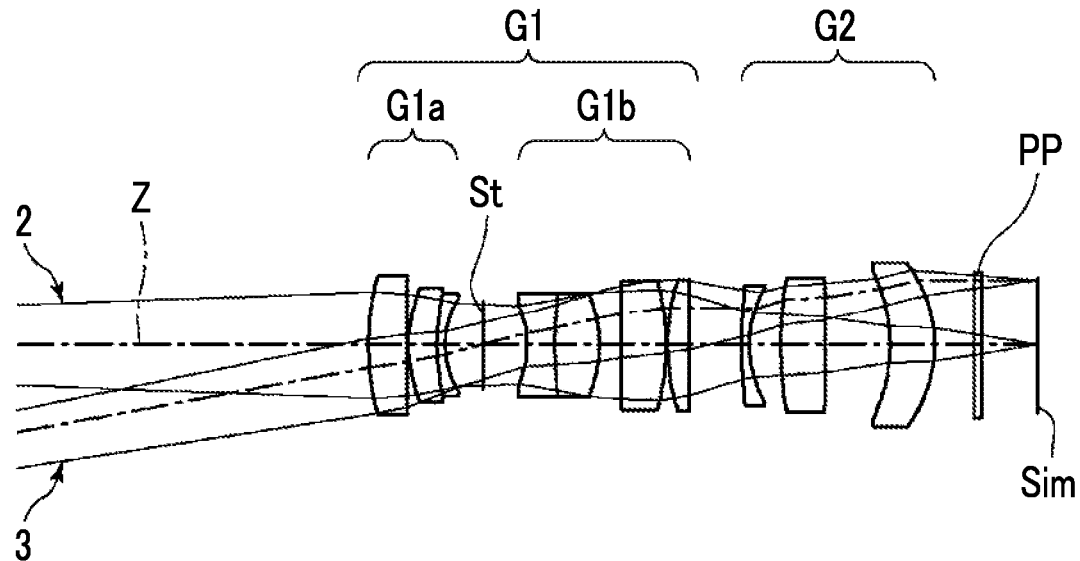

EXAMPLE 1

EXAMPLE 4

EXAMPLE 6

EXAMPLE 7

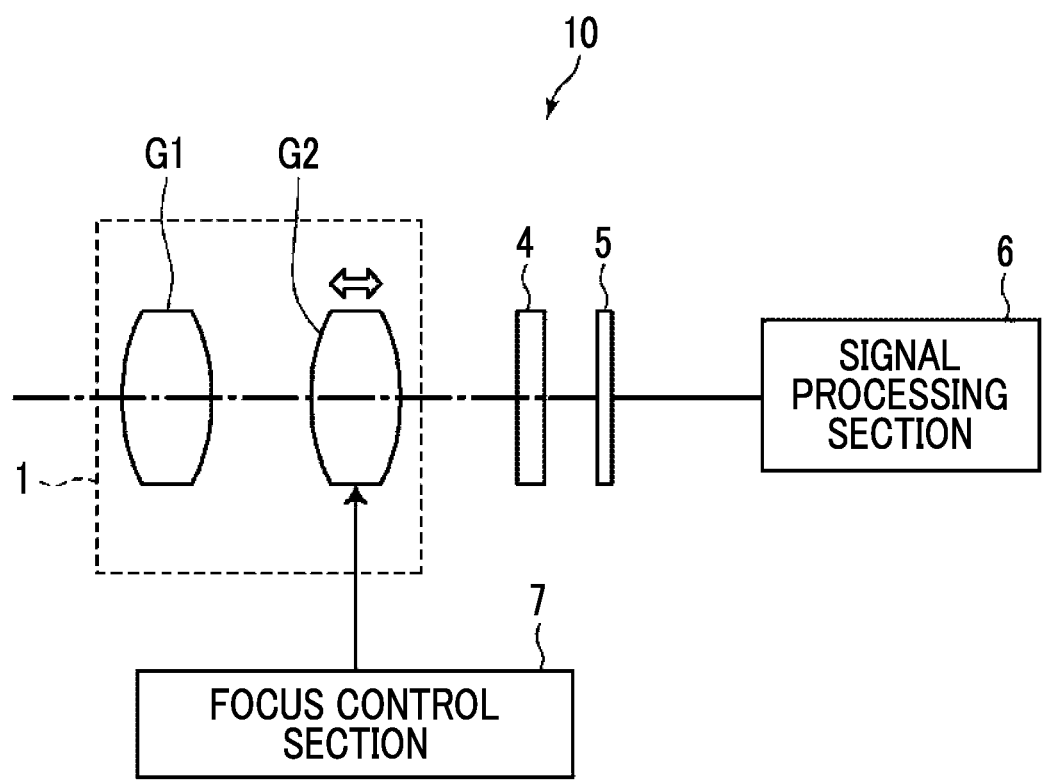

IMAGING LENS AND IMAGING APPARATUS

CROSS-REFERENCE TO RELATED APPLICATIONS

The present application claims priority under 35 U.S.C. § 119 to Japanese Patent Application No. 2017-178516, filed on Sep. 19, 2017. The above application is hereby expressly incorporated by reference, in its entirety, into the present application.

BACKGROUND OF THE INVENTION

1. Field of the Invention

The present invention relates to an imaging lens and an imaging apparatus. In particular, the present invention relates to an imaging lens, which is suitable for a factory automation (FA) camera, a machine vision (MV) camera, a digital camera, a surveillance camera, an on-board camera, a cinema camera, and the like, and an imaging apparatus comprising the imaging lens.

2. Description of the Related Art

In MV cameras and the like, an imaging lens having a focusing function has been used. As an imaging lens that has a focusing function conventionally known, for example, there are lenses described in JP2008-145801A. JP2008-145801A discloses a lens system including, in order from the magnification side, a first lens group and a second lens group, where a lens group (hereinafter referred to as a focus lens group) that moves in the direction of the optical axis during focusing is set as a second lens group.

SUMMARY OF THE INVENTION

In recent years, the camera is generally configured by combining an imaging lens and an imaging element such as a charge coupled device (CCD) or a complementary metal oxide semiconductor (CMOS). In such a configuration, there is a demand for an imaging lens having a small angle of incidence of the principal ray on the image plane at the maximum angle of view regardless of the imaging distance, for the purpose of suppressing a decrease in amount of peripheral light and the like.

Further, in the conventional imaging lens, there is a case where fluctuation in imaging range is caused by focusing, but it is also demanded to reduce this fluctuation.

In the lens system described in JP2008-145801A, fluctuation in imaging range is caused by focusing, and in particular, fluctuation in imaging range caused by focusing on the short distance side is large.

The present invention has been made in consideration of the above-mentioned situations, and its object is to provide an imaging lens, which has a small angle of incidence of the principal ray on the image plane at the maximum angle of view regardless of an imaging distance and small fluctuation in imaging range caused by moving a focus lens group so as to have favorable performance, and an imaging apparatus comprising the imaging lens.

In order to cope with the above-mentioned demands, an imaging lens of the present invention consists of, in order from an object side to an image side: a first lens group that has a positive refractive power and remains stationary with respect to an image plane during focusing; and a second lens group that moves toward the image side during focusing from a distant object to a close-range object. The first lens group has, successively in order from a position closest to the image side, a first-b sub-lens group having a positive refractive power and an aperture stop. In a state where an object at infinity is in focus, assuming that sbH is a distance from the aperture stop to an object side principal point of the first-b sub-lens group, f1b is a focal length of the first-b sub-lens group, f is a focal length of the whole system, and f2 is a focal length of the second lens group, Conditional Expressions (1) and (2) are satisfied.

$$0.5 < sbH/f1b < 1.5 \tag{1}$$

$$-0.2 < f/f2 < 0.2 \tag{2}$$

In the imaging lens of the present invention, it is preferable to satisfy at least one of Conditional Expression (1-1) or (2-1).

$$0.8 < sbH/f1b < 1.2 \tag{1-1}$$

$$-0.1 < f/f2 < 0.1 \tag{2-1}$$

In the imaging lens of the present invention, in a state where the object at infinity is in focus, assuming that h21 is a height of a paraxial on-axis ray at a lens surface closest to the object side in the second lens group, and h22 is a height of a paraxial on-axis ray at a lens surface closest to the image side in the second lens group, it is preferable to satisfy Conditional Expression (3), and it is more preferable to satisfy Conditional Expression (3-1).

$$0.3 < h21/h22 < 0.8 \tag{3}$$

$$0.4 < h21/h22 < 0.6 \tag{3-1}$$

In the imaging lens of the present invention, in a state where the object at infinity is in focus, assuming that Ffsr is an air-converted distance on an optical axis from an object side focal point of a synthetic optical system, which is formed by combining the first-b sub-lens group and the second lens group, to a lens surface closest to the object side in the synthetic optical system, and ds is a distance on the optical axis from a lens surface closest to the aperture stop at a position closer to the object side than the aperture stop to a lens surface closest to the aperture stop at a position closer to the image side than the aperture stop in a system in which a lens is present to be closer to the object side than the aperture stop and is infinite in a system in a lens is not present to be closer to the object side than the aperture stop, it is preferable to satisfy Conditional Expression (4), and it is more preferable to satisfy Conditional Expression (4-1).

$$0 \leq Ffsr/ds < 1 \tag{4}$$

$$0 \leq Ffsr/ds < 0.6 \tag{4-1}$$

In the imaging lens of the present invention, assuming that Ff1b is an air-converted distance on the optical axis from an object side focal point of the first-b sub-lens group to a lens surface closest to the object side in the first-b sub-lens group, and ds is a distance on the optical axis from a lens surface closest to the aperture stop at a position closer to the object side than the aperture stop to a lens surface closest to the aperture stop at a position closer to the image side than the aperture stop in a system in which a lens is present to be closer to the object side than the aperture stop and is infinite in a system in a lens is not present to be closer to the object side than the aperture stop, it is preferable to satisfy Conditional Expression (5), and it is more preferable to satisfy Conditional Expression (5-1).

$$0 \leq Ff1b/ds < 1 \tag{5}$$

$$0 \leq Ff1b/ds < 0.6 \tag{5-1}$$

In the imaging lens of the present invention, in a state where the object at infinity is in focus, assuming that Bf is a back focal length of the whole system at an air-converted distance, and dsp is a distance on the optical axis from a lens surface closest to the aperture stop at a position closer to the object side than the aperture stop to a lens surface closest to the aperture stop at a position closer to the image side than the aperture stop in a system in which a lens is present to be closer to the object side than the aperture stop, and is a distance on the optical axis from the aperture stop to a lens surface closest to the aperture stop at a position closer to the image side than the aperture stop in a system in which a lens is not present to be closer to the object side than the aperture stop, it is preferable to satisfy Conditional Expression (6), and it is more preferable to satisfy Conditional Expression (6-1).

$$1 < Bf/dsp < 2 \quad (6)$$

$$1.2 < Bf/dsp < 2 \quad (6\text{-}1)$$

In the imaging lens of the present invention, in a state where the object at infinity is in focus, assuming that Bf1 is a back focal length of the first lens group at an air-converted distance, and d is a distance on the optical axis between the first lens group and the second lens group, it is preferable to satisfy Conditional Expression (7), and it is more preferable to satisfy Conditional Expression (7-1).

$$1 < Bf1/d < 20 \quad (7)$$

$$2 < Bf1/d < 15 \quad (7\text{-}1)$$

An imaging apparatus of the present invention comprises the imaging lens of the present invention.

In the present description, it should be noted that the term "consists of ~" means that the imaging lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, it should be noted that the "~ group having a positive refractive power" means that the group has a positive refractive power as a whole. Likewise, the "~ group having a negative refractive power" means that the group has a negative refractive power as a whole. The sign of the refractive power is considered in terms of the paraxial region in a case where an aspheric surface is included. The "lens group" is not necessarily composed of a plurality of lenses, but may be composed of only one lens. The "whole system" means the entire imaging lens. The "Back focal length" is the distance on the optical axis from the lens surface closest to the image side to the image side focal point. All Conditional Expressions are based on the d line (a wavelength of 587.6 nm (nanometers)) in a state where an object at infinity is in focus.

According to the present invention, the lens system consists of, in order from the object side to the image side: a first lens group that has a positive refractive power and remains stationary during focusing; and a second lens group that moves toward the image side during focusing from the distant object to the close-range object. In the lens system, an aperture stop is disposed in the first lens group, and predetermined conditional expressions are satisfied. Thereby, it is possible to provide an imaging lens, which has a small angle of incidence of the principal ray on the image plane at the maximum angle of view regardless of an imaging distance and small fluctuation in imaging range caused by moving a focus lens group so as to have favorable performance, and an imaging apparatus comprising the imaging lens.

BRIEF DESCRIPTION OF THE DRAWINGS

FIG. 1 is a cross-sectional view illustrating a configuration and an optical path of an imaging lens (imaging lens of Example 1 of the present invention) according to an embodiment of the present invention.

FIG. 3 is a cross-sectional view illustrating a configuration and an optical path of an imaging lens of Example 2 of the present invention.

FIG. 4 is a cross-sectional view illustrating a configuration and an optical path of an imaging lens of Example 3 of the present invention.

FIG. 5 is a cross-sectional view illustrating a configuration and an optical path of an imaging lens of Example 4 of the present invention.

FIG. 6 is a cross-sectional view illustrating a configuration and an optical path of an imaging lens of Example 5 of the present invention.

FIG. 7 is a cross-sectional view illustrating a configuration and an optical path of an imaging lens of Example 6 of the present invention.

FIG. 8 is a cross-sectional view illustrating a configuration and an optical path of an imaging lens of Example 7 of the present invention.

FIG. 17 is a schematic configuration diagram of an imaging apparatus according to an embodiment of the present invention.

DESCRIPTION OF THE PREFERRED EMBODIMENTS

Figure 2:
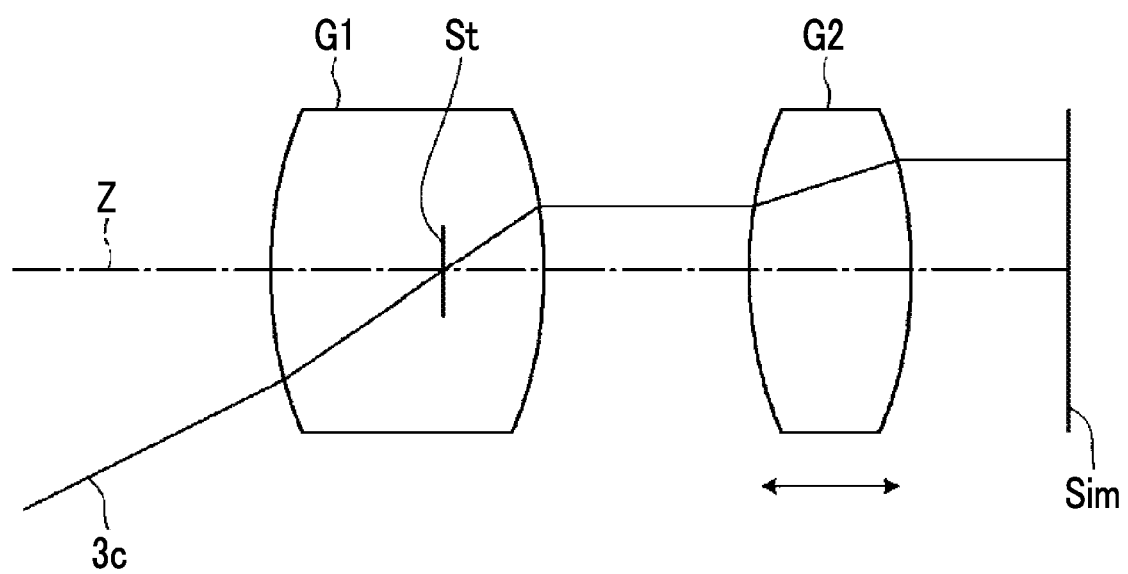
FIG. 2 is a conceptual diagram of an optical system consisting of a first lens group, which is telecentric on the image side, and a second lens group as an afocal system.

Hereinafter, embodiments of the present invention will be described with reference to drawings. FIG. 1 is a cross-sectional view illustrating a configuration and an optical path of an imaging lens according to an embodiment of the present invention. The example shown in FIG. 1 corresponds to the imaging lens of Example 1 to be described later. In FIG. 1, the left side thereof is the object side and the right side thereof is the image side, where on-axis rays 2 and rays with the maximum angle of view 3 are shown as optical paths. In FIG. 1, a state where an object at infinity is in focus is shown in the upper part labeled as "infinity", and a state where a close-range object having an object distance of "0.2 m" is in focus is shown in the lower part labeled as "0.2 m (meters)". It should be noted that the object distance is a distance on the optical axis Z from the lens surface, which is closest to the object side, to the object. Likewise, FIGS. 3 to 8 each are a cross-sectional view illustrating a configuration and an optical path of an imaging lens according to an embodiment of the present invention. The examples shown in FIGS. 3 to 8 correspond to the imaging lenses of Examples 2 to 7 to be described later. Basic configurations and methods shown in the drawings of examples shown in FIGS. 1 and 3 to 8 are the same, and will be hereinafter described with reference to mainly the example shown in FIG. 1.

The imaging lens consists of, in order from the object side to the image side along the optical axis Z: a first lens group G1 that has a positive refractive power and remains stationary with respect to an image plane Sim during focusing; and a second lens group G2 that moves toward the image side during focusing from a distant object to a close-range object. That is, the imaging lens is a rear focus type lens system, and a lens group (hereinafter referred to as a focus lens group), which moves in the direction of the optical axis during focusing, consists of the second lens group G2. The arrow pointing to the right under the second lens group G2 in FIG. 1 means that the second lens group G2 moves to the image side during focusing from the distant object to the close-range object.

In addition, FIG. 1 shows an example in which an optical member PP having a plane parallel plate shape is disposed between the lens closest to the image side and the image plane Sim. However, the optical member PP may be disposed at a position different from that in the example of FIG. 1, or the optical member PP may be omitted. The optical member PP is assumed to be various filters such as an infrared cut filter and a low pass filter, a cover glass, and the like.

The first lens group G1 is configured to have, successively in order from a position closest to the image side, a first-b sub-lens group G1b having a positive refractive power and an aperture stop St. That is, since the first lens group G1 has the aperture stop St and the first-b sub-lens group G1b successively in order from the object side to the image side, the first-b sub-lens group G1b is disposed to be closest to the image side in the first lens group G1. It should be noted that the aperture stop St shown in FIG. 1 does not necessarily indicate its size and shape, and indicates a position of the stop on the optical axis Z.

As in the example shown in FIG. 1, the first lens group G1 may have a lens at a position closer to the object side than the aperture stop St, and as in the example shown in FIG. 7, the first lens group G1 do not have to have a lens at a position closer to the object side than the aperture stop St. In the example of FIG. 1, the first lens group G1 consists of, in order from the object side to the image side, a first-a sub-lens group G1a, the aperture stop St, and the first-b sub-lens group G1b. The first-a sub-lens group G1a consists of three lenses La1 to La3 in order from the object side to the image side. The first-b sub-lens group G1b consists of five lenses Lb1 to Lb5 in order from the object side to the image side. The second lens group G2 consists of three lenses L21 to L23 in order from the object side to the image side.

The imaging lens of the present embodiment is configured to satisfy Conditional Expressions (1) and (2).

$$0.5 < sbH/f1b < 1.5 \quad (1)$$

$$-0.2 < f/f2 < 0.2 \quad (2)$$

Here, sbH is a distance from the aperture stop to an object side principal point of the first-b sub-lens group,
f1b is a focal length of the first-b sub-lens group,
f is a focal length of the whole system, and
f2 is a focal length of the second lens group.

All the reference signs used in Conditional Expressions are reference signs in a state where the object at infinity is in focus. The upper part of FIG. 1 shows the object side principal point bH of the first-b sub-lens group G1b. Here, the sign of sbH is positive in a case where the object side principal point bH of the first-b sub-lens group G1b is closer to the image side than the aperture stop St, and negative in a case where it is closer to the object side.

By satisfying Conditional Expression (1), it is possible to reduce the angle of the principal ray of the off-axis rays, which is emitted from the first lens group G1 and travels toward the second lens group G2, with respect to the optical axis Z. That is, the first lens group G1 can be configured to have high telecentricity on the image side. Further, by satisfying Conditional Expression (2), the second lens group G2 can be configured to be a substantially afocal system.

Here, in order to facilitate understanding, an optical system will be described with reference to FIG. 2. In the optical system, the first lens group G1 is configured to be telecentric on the image side, the second lens group G2 is configured as an afocal system, an aperture stop St is disposed in the first lens group G1. FIG. 2 is a diagram conceptually showing the optical system. In the optical system shown in FIG. 2, the principal ray 3c, which is incident on the first lens group G1 from the object side, passes through the intersection between the aperture stop St and the optical axis Z in the first lens group G1, and is thereafter emitted as a ray, which is parallel to the optical axis Z, from the first lens group G1. Then, the principal ray 3c, which is incident on the second lens group G2 in parallel with the optical axis Z, is emitted from the second lens group G2 while being parallel to the optical axis Z, and is incident on the image plane Sim. That is, in the optical system shown in FIG. 2, in a case where the principal ray 3c is a ray within the angle of view, regardless of the angle of view of the principal ray 3c in a case where the ray is incident on the first lens group G1, the angle of incidence of the principal ray 3c on the image plane Sim is always 0 degree.

In the optical system shown in FIG. 2, the principal ray 3c is parallel to the optical axis Z between the second lens group G2 and the image plane Sim. Thus, even in a case where the second lens group G2 as the focus lens group moves in the direction of the optical axis, the principal ray 3c, which is incident onto the second lens group G2 from the object side, remains parallel to the optical axis Z, and its height is also invariant. Therefore, even in a case where the second lens group G2 moves in the direction of the optical axis, the optical path of the principal ray 3c in the first lens group G1 does not change, and the angle and the height of the principal ray 3c incident on the whole system becomes invariant. That is, even in a case where the focus lens group moves in the direction of the optical axis, the relationship between the object height and the image height does not change, and the angle of view does not change either.

Figure 9:
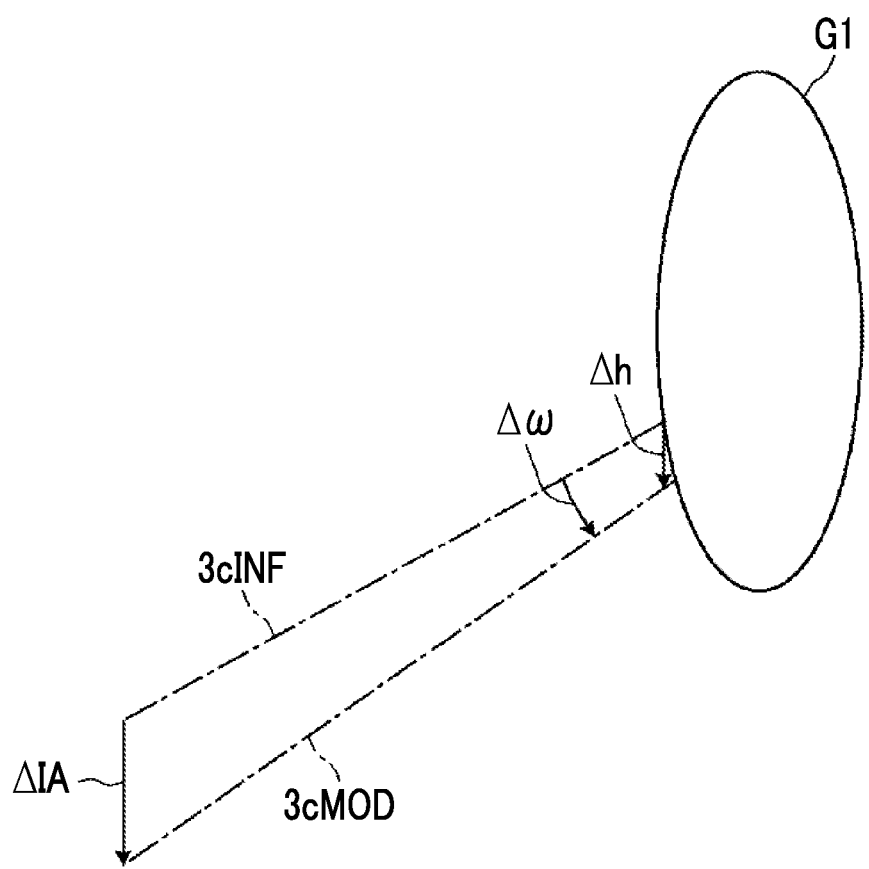
FIG. 9 is a diagram for explaining change in imaging range during focusing in a conventional imaging lens.

For comparison, FIG. 9 conceptually shows change in the principal ray incident on the first lens group G1 in a case where the focus lens group moves so as to perform focusing from the object at infinity to the close-range object in the conventional imaging lens. The first lens group G1 is a lens group closest to the object side. As shown in FIG. 9, in the conventional imaging lens, the optical paths of the principal ray 3cINF during focusing on the object at infinity and the ray 3cMOD during focusing on the close-range object become different, and the change in angle of view Δω and the change in incident height Δh occur. As a result, the change in imaging range ΔIA occurs. On the other hand, in the optical system shown in FIG. 2, even in a case where the focus lens group moves, the angle of view and the incident height of the principal ray 3c are invariant. Therefore, the imaging range can be made invariant.

In the imaging lens of the present embodiment, by satisfying Conditional Expressions (1) and (2), it is possible to realize the optical system of FIG. 2 or an optical system similar to the optical system of FIG. 2. By satisfying Conditional Expression (1), the angle of the principal ray emitted from the first lens group G1 to the second lens group G2 with respect to the optical axis Z becomes small, and it is possible to suppress fluctuation in height of the principal ray, which is incident on the second lens group G2, caused by moving the second lens group G2 as a focus lens group. By satisfying Conditional Expressions (1) and (2), even in a case where the focus lens group moves, it is possible to suppress changes in angle and height of the principal ray incident on the whole system. Therefore, it is possible to suppress fluctuation in angle of view and fluctuation in imaging range. Further, by satisfying Conditional Expressions (1) and (2), even in a case where the focus lens group moves, it is possible to reduce the angle of incidence of the principal ray, which is emitted from the whole imaging lens system, on the image plane Sim at the maximum angle of view.

In addition, in a case of a configuration in which Conditional Expression (1-1) is satisfied instead of Conditional Expression (1), it is possible to obtain more favorable characteristics. Further, in a case of a configuration in which Conditional Expression (2-1) is satisfied instead of Conditional Expression (2), it is possible to obtain more favorable characteristics.

$$0.8 < sbH/f1b < 1.2 \quad (1\text{-}1)$$

$$-0.1 < f/f2 < 0.1 \quad (2\text{-}1)$$

Further, it is preferable that the imaging lens satisfies at least one of Conditional Expressions (3) to (7).

$$0.3 < h21/h22 < 0.8 \quad (3)$$

$$0 \leq Ffsr/ds < 1 \quad (4)$$

$$0 \leq Ff1b/ds < 1 \quad (5)$$

$$1 < Bf/dsp < 2 \quad (6)$$

$$1 < Bf1/d < 20 \quad (7)$$

Here, h21 is a height of a paraxial on-axis ray at a lens surface closest to the object side in the second lens group, h22 is a height of a paraxial on-axis ray at a lens surface closest to the image side in the second lens group, Ffsr is an air-converted distance on an optical axis from an object side focal point of a synthetic optical system, which is formed by combining the first-b sub-lens group and the second lens group, to a lens surface closest to the object side in the synthetic optical system, ds is a distance on the optical axis from a lens surface closest to the aperture stop at a position closer to the object side than the aperture stop to a lens surface closest to the aperture stop at a position closer to the image side than the aperture stop in a system in which a lens is present to be closer to the object side than the aperture stop and is infinite in a system in a lens is not present to be closer to the object side than the aperture stop, Ff1b is an air-converted distance on the optical axis from an object side focal point of the first-b sub-lens group to a lens surface closest to the object side in the first-b sub-lens group, Bf is a back focal length of the whole system at an air-converted distance, dsp is a distance on the optical axis from a lens surface closest to the aperture stop at a position closer to the object side than the aperture stop to a lens surface closest to the aperture stop at a position closer to the image side than the aperture stop in a system in which a lens is present to be closer to the object side than the aperture stop, and is a distance on the optical axis from the aperture stop to a lens surface closest to the aperture stop at a position closer to the image side than the aperture stop in a system in which a lens is not present to be closer to the object side than the aperture stop, Bf1 is a back focal length of the first lens group at an air-converted distance, and d is a distance on the optical axis between the first lens group and the second lens group.

All the reference signs used in Conditional Expressions are reference signs in a state where the object at infinity is in focus. The h21 and h22 comply with the definition in paraxial ray tracing based on "Optical Technology Series 1 Lens Design Method" (Yoshiya Matsui, Kyoritsu Shuppan Co., Ltd.), pp. 19, (2.10)-(2.12). The sign of Ffsr is positive in a case where the lens surface closest to the object side in the above synthetic optical system is closer to the image side than the object side focal point of the synthetic optical system, and the sign is negative in a case where the lens surface is closer to the object side. The sign of Ff1b is positive in a case where the lens surface closest to the object side in the first-b sub-lens group G1b is closer to the image side than the object side focal point of the first-b sub-lens group G1b, and the sign is negative in a case where the lens surface is closer to the object side.

Hereinafter, each of the above conditional expressions will be described. In a case where the second lens group G2 is an afocal optical system, h21/h22 in Conditional Expression (3) corresponds to the afocal magnification of the second lens group G2. By not allowing the result of Conditional Expression (3) to be equal to or less than the lower limit, it is possible to minimize the total length of the second lens group G2. By not allowing the result of Conditional Expression (3) to be equal to or greater than the upper limit, it is possible to minimize the amount of movement of the focus lens group for focusing and to minimize the total length of the lens system. In addition, in a case of a configuration in which Conditional Expression (3-1) is satisfied instead of Conditional Expression (3), it is possible to obtain more favorable characteristics.

$$0.4 < h21/h22 < 0.6 \quad (3\text{-}1)$$

The Ffsr in Conditional Expression (4) corresponds to the front focus of the synthetic optical system formed by combining the first-b sub-lens group G1b and the second lens group G2. In the example of FIG. 1, the ds in Conditional Expression (4) is a distance on the optical axis between the lens surfaces opposed to each other with the aperture stop St interposed therebetween, and is a distance on the optical axis from the image side lens surface of the lens La3 to the object side lens surface of the lens Lb1. However, in the example of FIG. 7, the ds is infinite. By satisfying Conditional Expression (4), it becomes easy to make the whole imaging lens system telecentric on the image side. In addition, in a case of a configuration in which Conditional Expression (4-1) is satisfied instead of Conditional Expression (4), it is possible to obtain more favorable characteristics.

$$0 \leq Ffsr/ds < 0.6 \quad (4\text{-}1)$$

The Ff1b in Conditional Expression (5) corresponds to the front focus of the first-b sub-lens group G1b. By satisfying Conditional Expression (5), it becomes easy to make the first lens group G1 telecentric on the image side. In addition, in a case of a configuration in which Conditional Expression (5-1) is satisfied, it is possible to obtain more favorable characteristics.

$$0 \leq Ff1b/ds < 0.6 \quad (5\text{-}1)$$

In the example of FIG. 1, the dsp in Conditional Expression (6) is a distance on the optical axis between the lens surfaces opposed to each other with the aperture stop St interposed therebetween, and is a distance on the optical axis from the image side lens surface of the lens La3 to the object side lens surface of the lens Lb1. However, in the example of FIG. 7, dsp is a distance on the optical axis from the aperture stop St to the object side lens surface of the lens Lb1. By not allowing the result of Conditional Expression (6) to be equal to or less than the lower limit, it is possible to ensure a distance between the imaging lens and the imaging element, and it becomes easy to construct a mechanical structure in the imaging apparatus. By not allowing the result of Conditional Expression (6) to be equal to or greater than the upper limit, the total length of the lens system can be prevented from becoming excessively long. In addition, in a case of a configuration in which Conditional Expression (6-1) is satisfied, it is possible to obtain more favorable characteristics.

$$1.2 < Bf/dsp < 2 \quad (6\text{-}1)$$

By not allowing the result of Conditional Expression (7) to be equal to or less than the lower limit, it is possible to adopt a configuration in which a primary image is formed between the first lens group G1 and the second lens group G2, and thus the function of the focus lens group can be fulfilled. By not allowing the result of Conditional Expression (7) to be equal to or greater than the upper limit, it becomes easy to ensure the F number to the extent practically required. In addition, in a case of a configuration in which Conditional Expression (7-1) is satisfied, it is possible to obtain more favorable characteristics.

$$2 < Bf1/d < 15 \quad (7\text{-}1)$$

The above-mentioned preferred configurations and available configurations may be optional combinations, and it is preferable to selectively adopt the configurations in accordance with required specification. According to the present embodiment, it is possible to realize an imaging lens which has a small angle of incidence of the principal ray on the image plane Sim at the maximum angle of view regardless of an imaging distance and small fluctuation in imaging range caused by moving a focus lens group so as to have favorable performance. Further, the term "the small angle of incidence of the principal ray onto the image plane Sim at the maximum angle of view" means that the angle formed by the perpendicular of the image plane Sim and the principal ray at the maximum angle of view is in a range of −5° to +5°. Further, the "movement of the focus lens group" is not limited only to the focusing operation in a case where the object distance fluctuates, but also includes, for example, the movement of the focus lens group due to vibration.

Next, numerical examples of the imaging lens of the present invention will be described.

Example 1

FIG. 1 shows a cross-sectional view of an imaging lens of Example 1, and an illustration method thereof is as described above. Therefore, repeated description is partially omitted herein. The imaging lens of Example 1 consists of, in order from the object side to the image side, a first lens group G1 having a positive refractive power and a second lens group G2 having a positive refractive power. During focusing from a distant object to a close-range object, the first lens group G1 remains stationary with respect to the image plane Sim, and the second lens group G2 moves toward the image side. The first lens group G1 consists of, in order from the object side to the image side, a first-a sub-lens group G1a, an aperture stop St, and a first-b sub-lens group G1b. The first-a sub-lens group G1a consists of three lenses La1 to La3 in order from the object side to the image side. The first-b sub-lens group G1b consists of five lenses Lb1 to Lb5 in order from the object side to the image side. The second lens group G2 consists of three lenses L21 to L23 in order from the object side to the image side.

Table 1 shows basic lens data of the imaging lens of Example 1, and Table 2 shows specification and variable surface distances. In Table 1, the column of the surface number shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows refractive indexes of the respective components at the d line (a wavelength of 587.6 nm (nanometers)), and the column of vd shows Abbe numbers of the respective components at the d line.

In Table 1, reference signs of radii of curvature of surface shapes convex toward the object side are set to be positive, and reference signs of radii of curvature of surface shapes convex toward the image side are set to be negative. Table 1 additionally shows the aperture stop St and the optical member PP. In Table 1, in a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the variable surface distances are referenced by the reference signs DD[ ], and are written into places of D, where object side surface numbers of distances are noted in [ ].

Table 2 shows the focal length f of the whole system in a state where the object at infinity is in focus, the focal length fnear of the whole system in a state where an object having an object distance of 0.2 m (meters) is in focus, and the back focal length Bf of the whole system at the air-converted distance in the state where the object at infinity is in focus. In Table 2, values of the F number FNo, the maximum total angle of view 2ω, and the variable surface distance in the state where the object at infinity is in focus and the state where the object having the object distance of 0.2 m (meters) is in focus are based on the d line.)(° in the place of 2ω indicates that the unit thereof is a degree. In Table 2, the column denoted by the "infinity" shows respective values thereof in a state where the object at infinity is in focus, and the column denoted by "0.2 m" shows respective values thereof in a state where an object at an object distance of 0.2 m (meters) is in focus.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Surface Number | R | D | Nd | vd |
|---|---|---|---|---|
| 1 | 57.89274 | 3.435 | 1.51999 | 64.23 |
| 2 | −91.36596 | 0.200 | | |
| 3 | 19.96400 | 2.476 | 1.79585 | 25.21 |
| 4 | 31.99641 | 1.010 | 1.51999 | 64.23 |
| 5 | 11.53491 | 7.781 | | |
| 6 (St) | ∞ | 5.177 | | |
| 7 | −11.27270 | 3.731 | 1.73379 | 31.54 |
| 8 | 151.21396 | 6.010 | 1.53775 | 74.70 |
| 9 | −17.96795 | 0.200 | | |
| 10 | −91.95969 | 3.453 | 1.59522 | 67.73 |
| 11 | −20.48590 | 0.200 | | |
| 12 | 79.82503 | 2.601 | 1.71152 | 55.92 |
| 13 | −85.68681 | 0.200 | | |
| 14 | 28.17225 | 2.632 | 1.68207 | 57.40 |
| 15 | 86.89963 | DD[15] | | |
| 16 | 109.40601 | 1.000 | 1.84999 | 28.91 |
| 17 | 15.10055 | 4.914 | | |
| 18 | 77.82159 | 6.000 | 1.85001 | 22.50 |
| 19 | −84.59731 | 8.155 | | |
| 20 | −23.53324 | 6.000 | 1.68437 | 38.46 |
| 21 | −18.19205 | DD[21] | | |
| 22 | ∞ | 1.000 | 1.51680 | 64.20 |
| 23 | ∞ | 6.105 | | |

TABLE 2

Example 1

| | Infinity | 0.2 m |
|---|---|---|
| f | 36.013 | — |
| fnear | — | 36.098 |
| Bf | 16.764 | — |
| FNo. | 2.72 | 2.90 |
| 2ω (°) | 28.6 | 28.6 |
| DD[15] | 3.083 | 6.030 |
| DD[21] | 10.000 | 7.053 |

Figure 10:
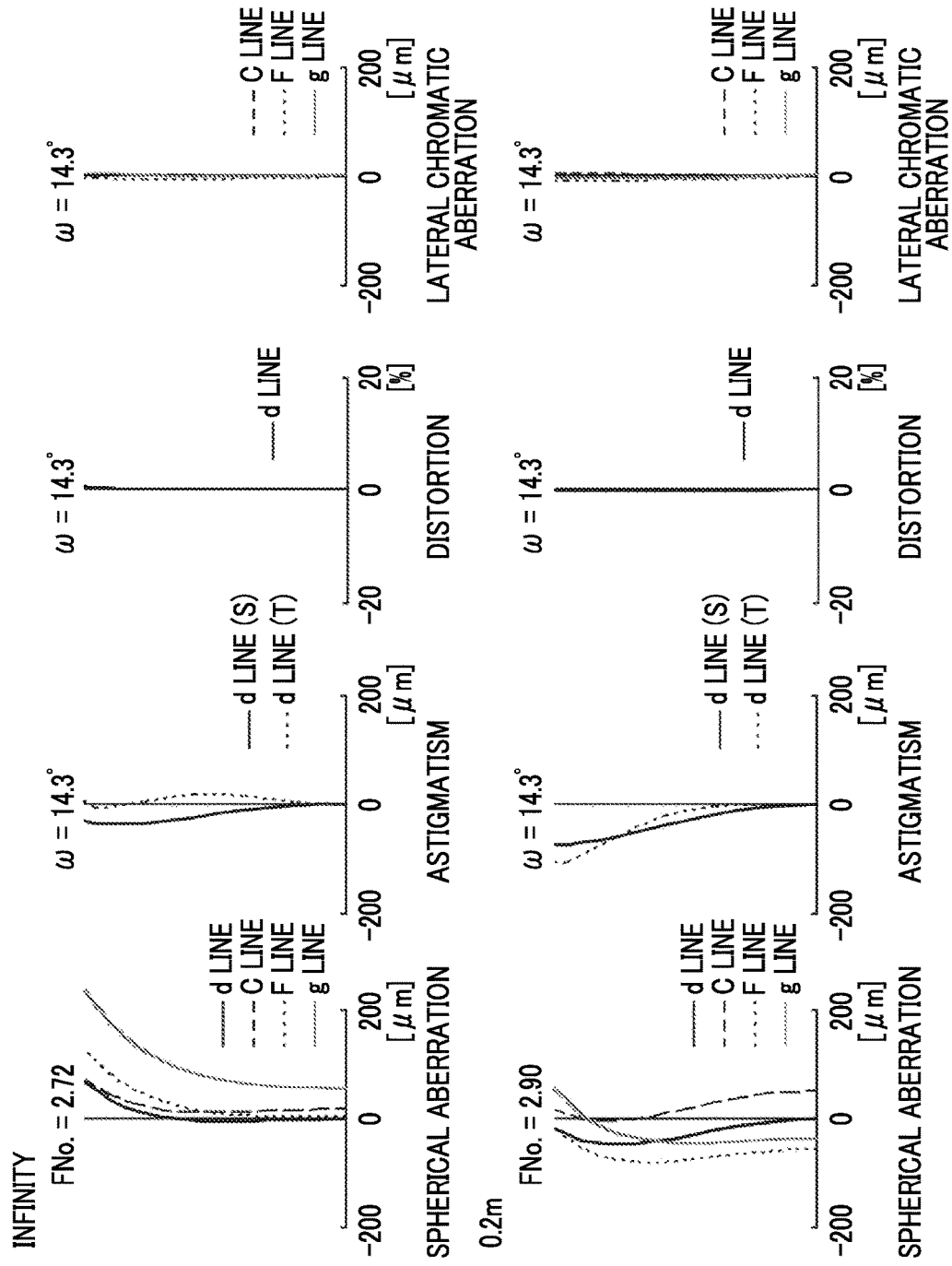
FIG. 10 is a diagram of aberrations of the imaging lens of Example 1 of the present invention.

FIG. 10 shows a diagram of aberrations of the imaging lens of Example 1. In FIG. 10, in order from the left side, spherical aberration, astigmatism, distortion, and lateral chromatic aberration are shown. In FIG. 10, a state where an object at infinity is in focus is shown in the upper part labeled as "infinity", and a state where a close-range object having an object distance of "0.2 m" is in focus is shown in the lower part labeled as "0.2 m (meters)". In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the gray solid line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the gray solid line. In the spherical aberration diagram, FNo. indicates an F number. In the other aberration diagrams, ω indicates a half angle of view.

The symbols, the meanings, the description method, and the illustration method of each data relating to the above-mentioned imaging lens of Example 1 are the same in Examples unless otherwise specified. Therefore, repeated examples will be omitted below.

Example 2

Figure 11:
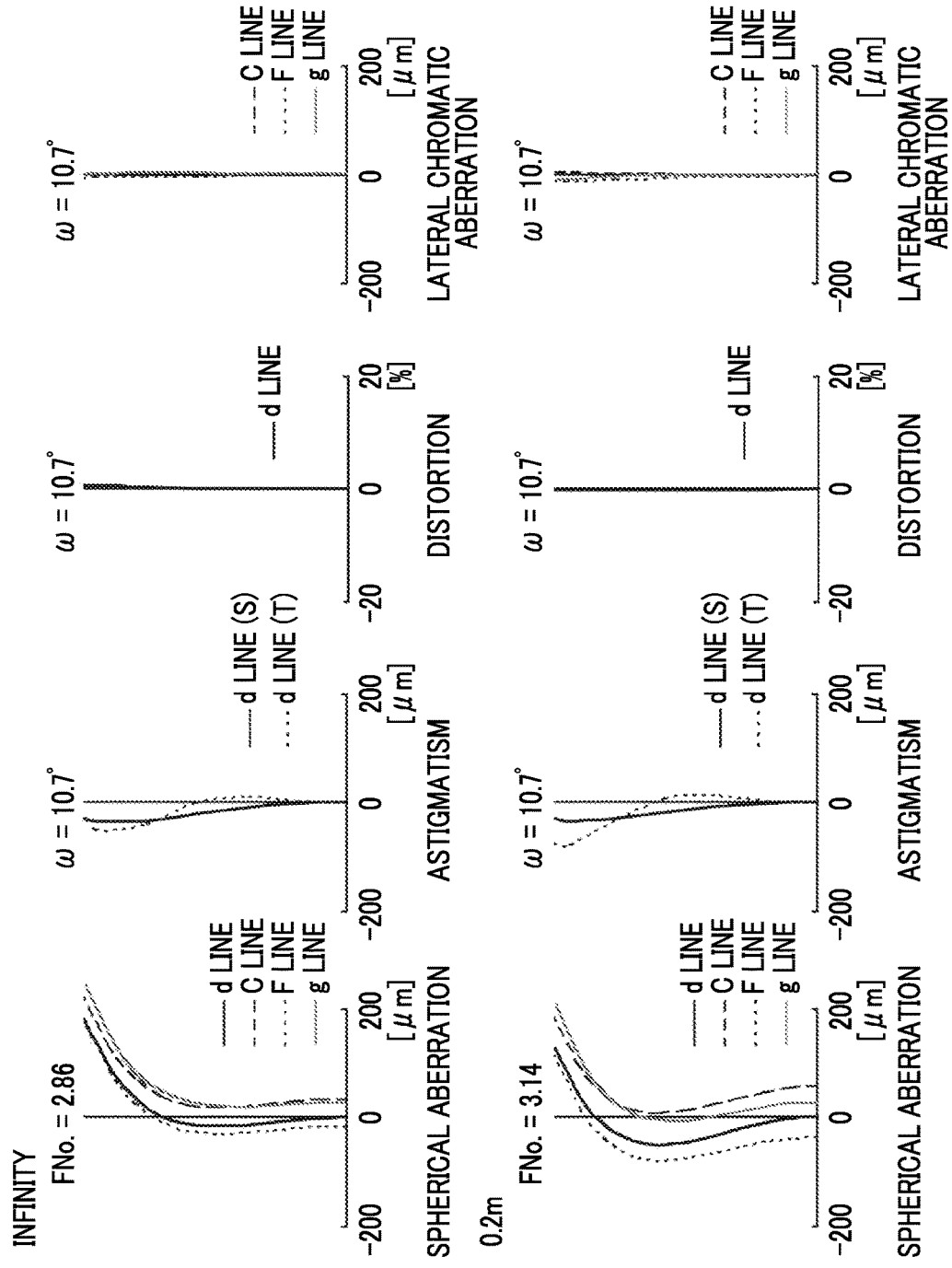
FIG. 11 is a diagram of aberrations of the imaging lens of Example 2 of the present invention.

FIG. 3 is a cross-sectional view of an imaging lens of Example 2. The imaging lens of Example 2 consists of, in order from the object side to the image side, a first lens group G1 having a positive refractive power and a second lens group G2 having a positive refractive power. During focusing from a distant object to a close-range object, the first lens group G1 remains stationary with respect to the image plane Sim, and the second lens group G2 moves toward the image side. The first lens group G1 consists of, in order from the object side to the image side, a first-a sub-lens group G1a, an aperture stop St, and a first-b sub-lens group G1b. The first-a sub-lens group G1a consists of three lenses La1 to La3 in order from the object side to the image side. The first-b sub-lens group G1b consists of five lenses Lb1 to Lb5 in order from the object side to the image side. The second lens group G2 consists of three lenses L21 to L23 in order from the object side to the image side. Table 3 shows basic lens data of the imaging lens of Example 2, Table 4 shows specification and variable surface distances, and FIG. 11 shows aberration diagrams thereof.

TABLE 3

Example 2

| Surface Number | R | D | Nd | vd |
|---|---|---|---|---|
| 1 | 25.47686 | 4.092 | 1.72551 | 55.22 |
| 2 | 261.86195 | 0.200 | | |
| 3 | 19.99278 | 2.292 | 1.84399 | 23.12 |
| 4 | 27.90409 | 1.045 | 1.54686 | 53.35 |
| 5 | 11.34321 | 5.271 | | |
| 6 (St) | ∞ | 5.827 | | |
| 7 | −13.79559 | 1.317 | 1.82324 | 23.84 |
| 8 | 42.11701 | 5.017 | 1.49700 | 81.54 |
| 9 | −22.86594 | 2.875 | | |
| 10 | −74.51508 | 2.908 | 1.82996 | 44.51 |
| 11 | −23.92404 | 0.200 | | |
| 12 | 170.09040 | 2.257 | 1.76358 | 51.64 |
| 13 | −81.78636 | 0.200 | | |
| 14 | 41.09769 | 3.049 | 1.74595 | 53.41 |
| 15 | −103.05031 | DD[15] | | |
| 16 | 69.71212 | 1.000 | 1.85001 | 37.48 |
| 17 | 13.28087 | 4.388 | | |
| 18 | 103.15745 | 2.702 | 1.85001 | 22.50 |
| 19 | −83.40264 | 10.041 | | |
| 20 | −20.56924 | 6.000 | 1.83313 | 44.69 |
| 21 | −16.89828 | DD[21] | | |
| 22 | ∞ | 1.000 | 1.51680 | 64.20 |
| 23 | ∞ | 7.047 | | |

TABLE 4

| | Example 2 | |
|---|---|---|
| | Infinity | 0.2 m |
| f | 48.503 | — |
| fnear | — | 48.599 |
| Bf | 17.706 | — |
| FNo. | 2.86 | 3.14 |
| 2ω (°) | 21.4 | 21.4 |
| DD[15] | 1.675 | 6.161 |
| DD[21] | 10.000 | 5.514 |

Example 3

Figure 12:
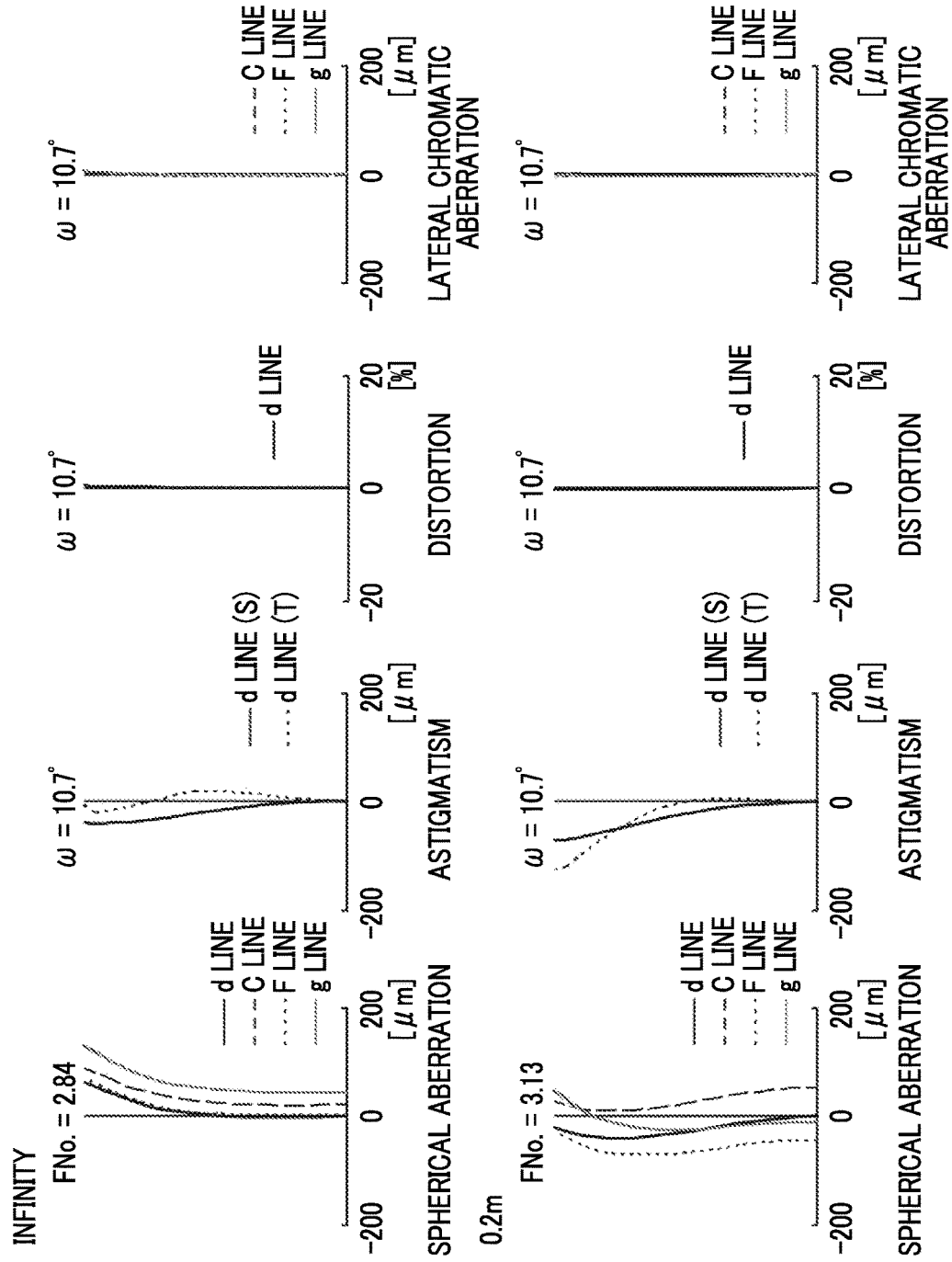
FIG. 12 is a diagram of aberrations of the imaging lens of Example 3 of the present invention.

FIG. 4 is a cross-sectional view of an imaging lens of Example 3. The imaging lens of Example 3 consists of, in order from the object side to the image side, a first lens group G1 having a positive refractive power and a second lens group G2 having a positive refractive power. During focusing from a distant object to a close-range object, the first lens group G1 remains stationary with respect to the image plane Sim, and the second lens group G2 moves toward the image side. The first lens group G1 consists of, in order from the object side to the image side, a first-a sub-lens group G1a, an aperture stop St, and a first-b sub-lens group G1b. The first-a sub-lens group G1a consists of three lenses La1 to La3 in order from the object side to the image side. The first-b sub-lens group G1b consists of five lenses Lb1 to Lb5 in order from the object side to the image side. The second lens group G2 consists of three lenses L21 to L23 in order from the object side to the image side. Table 5 shows basic lens data of the imaging lens of Example 3, Table 6 shows specification and variable surface distances, and FIG. 12 shows aberration diagrams thereof.

TABLE 5

| Example 3 | | | | |
|---|---|---|---|---|
| Surface Number | R | D | Nd | vd |
| 1 | 22.93229 | 4.641 | 1.56585 | 42.65 |
| 2 | 533.63772 | 0.200 | | |
| 3 | 20.17950 | 2.904 | 1.69228 | 56.89 |
| 4 | 44.42156 | 1.010 | 1.54934 | 55.62 |
| 5 | 11.03562 | 5.417 | | |
| 6 (St) | ∞ | 6.563 | | |
| 7 | −11.33070 | 3.643 | 1.80490 | 32.24 |
| 8 | 119.54281 | 4.318 | 1.49700 | 81.54 |
| 9 | −18.52930 | 1.061 | | |
| 10 | −119.93787 | 3.929 | 1.59522 | 67.73 |
| 11 | −18.43767 | 0.200 | | |
| 12 | 86.60998 | 2.464 | 1.70508 | 56.25 |
| 13 | −99.34469 | 0.200 | | |
| 14 | 31.56318 | 2.578 | 1.70483 | 56.26 |
| 15 | 120.87796 | DD[15] | | |
| 16 | 53.75975 | 1.000 | 1.90366 | 31.31 |
| 17 | 13.86273 | 4.525 | | |
| 18 | 108.54421 | 2.470 | 1.95906 | 17.47 |
| 19 | −117.86384 | 11.379 | | |
| 20 | −22.57280 | 6.000 | 1.74697 | 53.30 |
| 21 | −17.35146 | DD[21] | | |
| 22 | ∞ | 1.000 | 1.51680 | 64.20 |
| 23 | ∞ | 7.432 | | |

TABLE 6

| | Example 3 | |
|---|---|---|
| | Infinity | 0.2 m |
| f | 48.504 | — |
| fnear | — | 48.600 |
| Bf | 18.091 | — |
| FNo. | 2.84 | 3.13 |
| 2ω (°) | 21.4 | 21.4 |
| DD[15] | 2.432 | 7.110 |
| DD[21] | 10.000 | 5.322 |

Example 4

Figure 13:
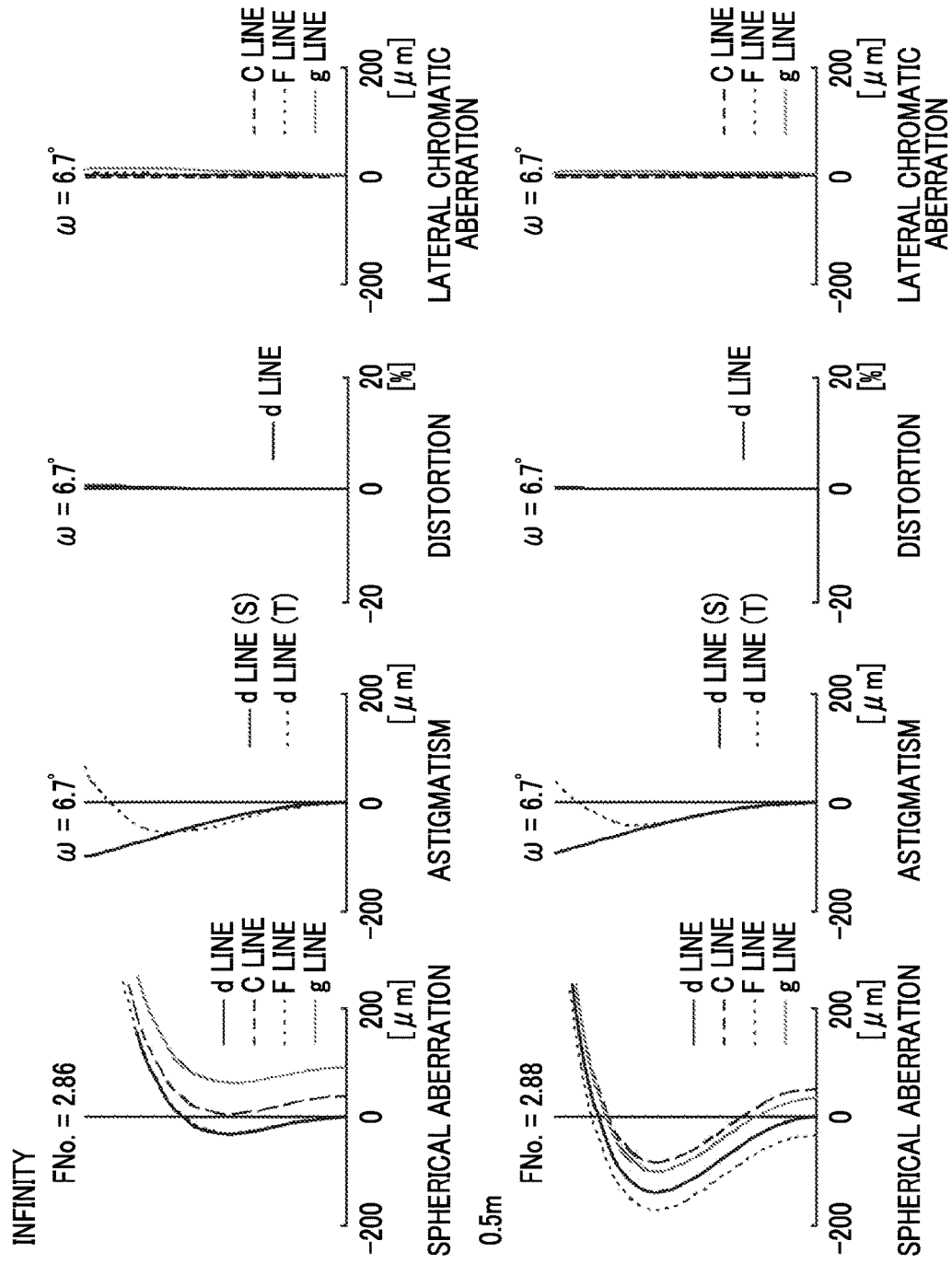
FIG. 13 is a diagram of aberrations of the imaging lens of Example 4 of the present invention.

FIG. 5 is a cross-sectional view of an imaging lens of Example 4. The imaging lens of Example 4 consists of, in order from the object side to the image side, a first lens group G1 having a positive refractive power and a second lens group G2 having a positive refractive power. During focusing from a distant object to a close-range object, the first lens group G1 remains stationary with respect to the image plane Sim, and the second lens group G2 moves toward the image side. The first lens group G1 consists of, in order from the object side to the image side, a first-a sub-lens group G1a, an aperture stop St, and a first-b sub-lens group G1b. The first-a sub-lens group G1a consists of one lens La1. The first-b sub-lens group G1b consists of three lenses Lb1 to Lb3 in order from the object side to the image side. The second lens group G2 consists of two lenses L21 and L22 in order from the object side to the image side. Table 7 shows basic lens data of the imaging lens of Example 4, Table 8 shows specification and variable surface distances, and FIG. 13 shows aberration diagrams thereof. FIG. 5, Table 8, and FIG. 13 show data representing a state, in which the object at infinity is in focus, and a state in which an object having an object distance of 0.5 m (meters) is in focus.

TABLE 7

| Example 4 | | | | |
|---|---|---|---|---|
| Surface Number | R | D | Nd | vd |
| 1 | 16.48350 | 4.241 | 1.73505 | 54.50 |
| 2 | 93.10077 | 5.424 | | |
| 3 (St) | ∞ | 3.264 | | |
| 4 | −23.89481 | 3.836 | 1.71553 | 29.22 |
| 5 | 10.90260 | 1.081 | | |
| 6 | 25.69589 | 3.729 | 1.59522 | 67.73 |
| 7 | −23.77895 | 5.928 | | |
| 8 | 40.93421 | 3.629 | 1.85001 | 41.92 |
| 9 | −22.85744 | DD[9] | | |
| 10 | −22.19668 | 1.000 | 1.85000 | 43.00 |
| 11 | 13.67892 | 5.387 | | |
| 12 | 74.35211 | 4.873 | 1.65733 | 49.13 |
| 13 | −13.58435 | DD[13] | | |
| 14 | ∞ | 1.000 | 1.51680 | 64.20 |
| 15 | ∞ | 2.236 | | |

TABLE 8

| | Example 4 | |
|---|---|---|
| | Infinity | 0.5 m |
| f | 48.471 | — |
| fnear | — | 48.569 |
| Bf | 12.895 | — |
| FNo. | 2.86 | 2.88 |
| 2ω (°) | 13.4 | 13.4 |

TABLE 8-continued

| | Example 4 | |
|---|---|---|
| | Infinity | 0.5 m |
| DD[9] | 2.362 | 4.353 |
| DD[13] | 10.000 | 8.009 |

Example 5

Figure 14:
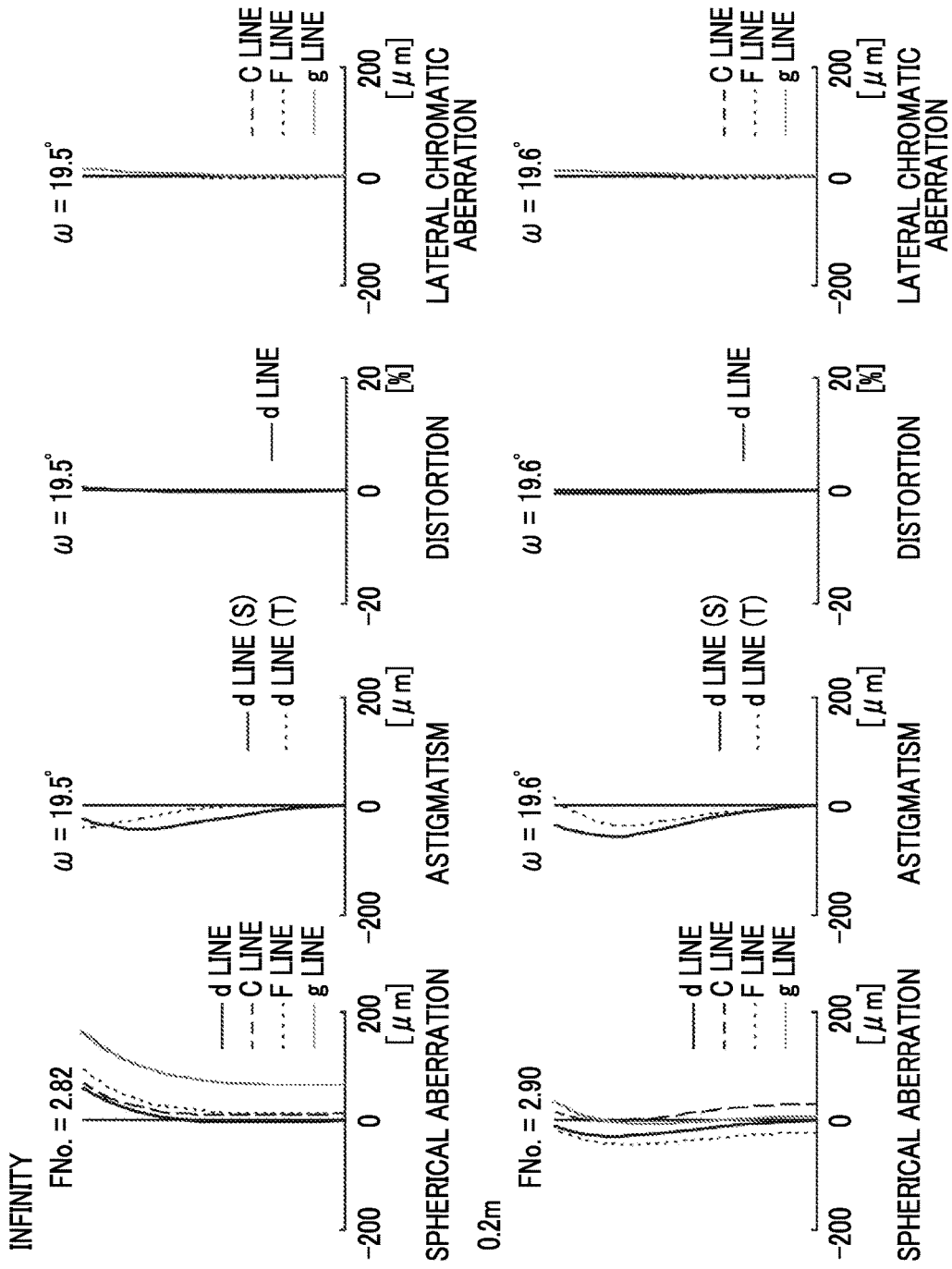
FIG. 14 is a diagram of aberrations of the imaging lens of Example 5 of the present invention.

FIG. 6 is a cross-sectional view of an imaging lens of Example 5. The imaging lens of Example 5 consists of, in order from the object side to the image side, a first lens group G1 having a positive refractive power and a second lens group G2 having a positive refractive power. During focusing from a distant object to a close-range object, the first lens group G1 remains stationary with respect to the image plane Sim, and the second lens group G2 moves toward the image side. The first lens group G1 consists of, in order from the object side to the image side, a first-a sub-lens group G1a, an aperture stop St, and a first-b sub-lens group G1b. The first-a sub-lens group G1a consists of three lenses La1 to La3 in order from the object side to the image side. The first-b sub-lens group G1b consists of five lenses Lb1 to Lb5 in order from the object side to the image side. The second lens group G2 consists of three lenses L21 to L23 in order from the object side to the image side. Table 9 shows basic lens data of the imaging lens of Example 5, Table 10 shows specification and variable surface distances, and FIG. 14 shows aberration diagrams thereof.

TABLE 9

| | Example 5 | | | |
|---|---|---|---|---|
| Surface Number | R | D | Nd | vd |
| 1 | 53.45838 | 2.480 | 1.80610 | 40.93 |
| 2 | −566.43434 | 2.330 | | |
| 3 | 58.98162 | 1.000 | 1.53775 | 74.70 |
| 4 | 11.45178 | 5.703 | | |
| 5 | 60.18258 | 3.390 | 1.91865 | 19.07 |
| 6 | 375.07745 | 8.257 | | |
| 7 (St) | ∞ | 3.522 | | |
| 8 | −17.73423 | 7.776 | 1.73492 | 39.00 |
| 9 | 50.10187 | 3.397 | 1.59522 | 67.73 |
| 10 | −20.49550 | 0.200 | | |
| 11 | −620.83841 | 2.219 | 1.75202 | 52.80 |
| 12 | −27.63137 | 0.200 | | |
| 13 | 33.45951 | 2.300 | 1.53618 | 74.43 |
| 14 | −189.93249 | 0.200 | | |
| 15 | 17.48574 | 2.417 | 1.52139 | 76.71 |
| 16 | 46.71096 | DD[16] | | |
| 17 | 238.16661 | 1.000 | 1.85000 | 22.50 |
| 18 | 12.50698 | 9.272 | | |
| 19 | −3719.28107 | 2.531 | 1.95906 | 17.47 |
| 20 | −33.97888 | 1.780 | | |
| 21 | −18.04970 | 7.396 | 1.65046 | 41.59 |
| 22 | −16.90555 | DD[22] | | |
| 23 | ∞ | 1.000 | 1.51680 | 64.20 |
| 24 | ∞ | 3.848 | | |

TABLE 10

| | Example 5 | |
|---|---|---|
| | Infinity | 0.2 m |
| f | 25.756 | — |
| fnear | — | 25.778 |
| Bf | 14.508 | — |
| FNo. | 2.82 | 2.90 |

TABLE 10-continued

| | Example 5 | |
|---|---|---|
| | Infinity | 0.2 m |
| 2ω (°) | 39.0 | 39.2 |
| DD[16] | 3.130 | 4.068 |
| DD[22] | 10.000 | 9.062 |

Example 6

Figure 15:
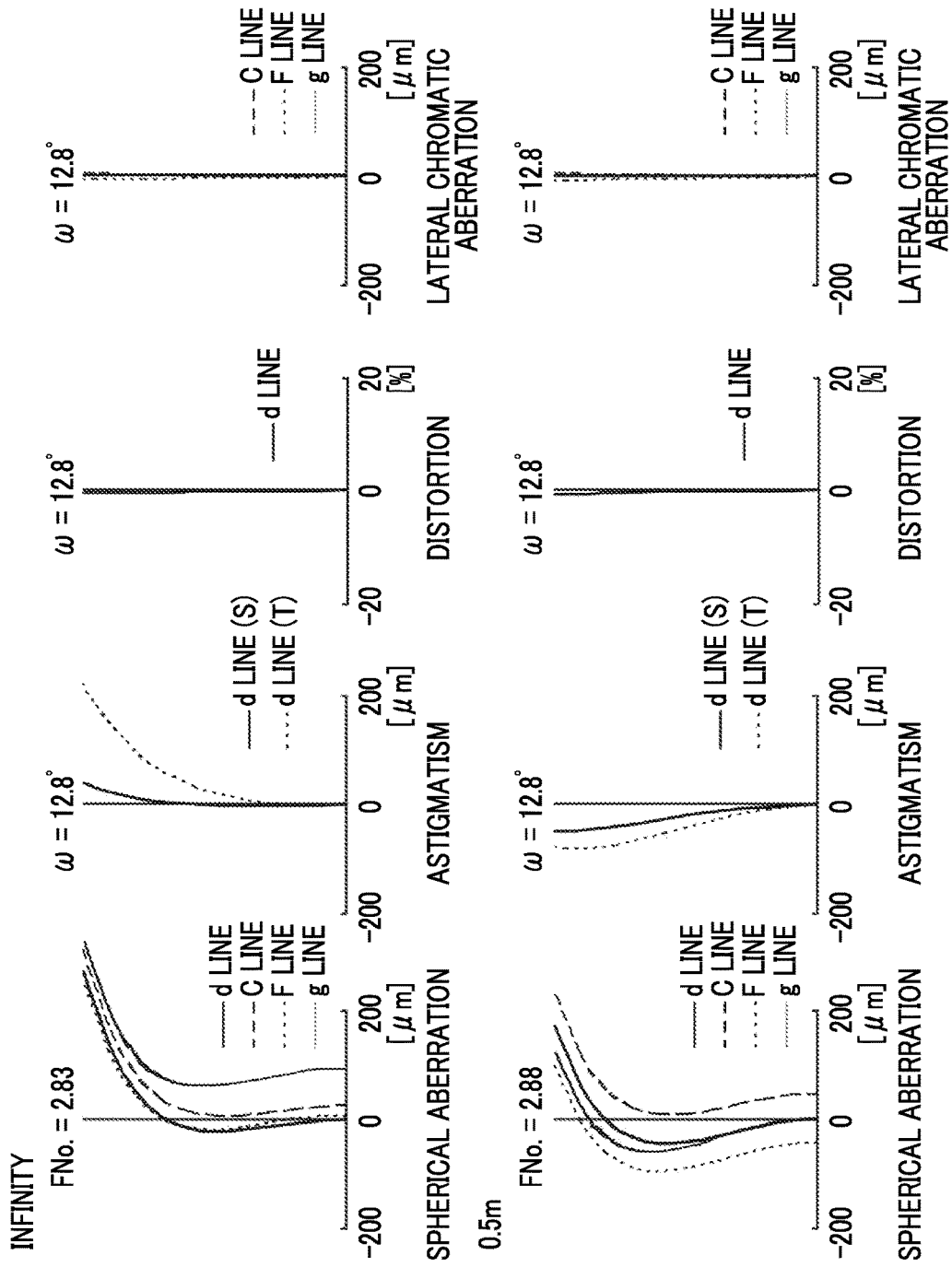
FIG. 15 is a diagram of aberrations of the imaging lens of Example 6 of the present invention.

FIG. 7 is a cross-sectional view of an imaging lens of Example 6. The imaging lens of Example 6 consists of, in order from the object side to the image side, a first lens group G1 having a positive refractive power and a second lens group G2 having a positive refractive power. During focusing from a distant object to a close-range object, the first lens group G1 remains stationary with respect to the image plane Sim, and the second lens group G2 moves toward the image side. The first lens group G1 consists of an aperture stop St and a first-b sub-lens group G1b in order from the object side to the image side. That is, the imaging lens of Example 6 is a system in which no lens is present at a position closer to the object side than the aperture stop St. The first-b sub-lens group G1b consists of four lenses Lb1 to Lb4 in order from the object side to the image side. The second lens group G2 consists of two lenses L21 and L22 in order from the object side to the image side. Table 11 shows basic lens data of the imaging lens of Example 6, Table 12 shows specification and variable surface distances, and FIG. 15 shows aberration diagrams thereof. FIG. 7, Table 12, and FIG. 15 show data representing a state, in which the object at infinity is in focus, and a state in which an object having an object distance of 0.5 m (meters) is in focus.

TABLE 11

| | Example 6 | | | |
|---|---|---|---|---|
| Surface Number | R | D | Nd | vd |
| 1 (St) | ∞ | 5.805 | | |
| 2 | −10.09399 | 1.025 | 1.57927 | 40.14 |
| 3 | 32.03424 | 1.204 | | |
| 4 | −56.97976 | 2.527 | 1.82180 | 45.82 |
| 5 | −16.50326 | 0.200 | | |
| 6 | 35.91542 | 3.578 | 1.70200 | 56.40 |
| 7 | −25.72621 | 0.200 | | |
| 8 | 30.30771 | 4.873 | 1.60298 | 61.04 |
| 9 | −39.17185 | DD[9] | | |
| 10 | −65.61842 | 1.000 | 1.82407 | 23.83 |
| 11 | 13.08880 | 9.775 | | |
| 12 | 70.40420 | 3.235 | 1.85000 | 41.31 |
| 13 | −28.01034 | DD[13] | | |
| 14 | ∞ | 1.000 | 1.51680 | 64.20 |
| 15 | ∞ | 0.860 | | |

TABLE 12

| | Example 6 | |
|---|---|---|
| | Infinity | 0.5 m |
| f | 25.512 | — |
| fnear | — | 25.542 |
| Bf | 11.520 | — |
| FNo. | 2.83 | 2.88 |
| 2ω (°) | 25.6 | 25.6 |
| DD[9] | 5.293 | 5.838 |
| DD[13] | 10.000 | 9.455 |

Example 7

Figure 16:
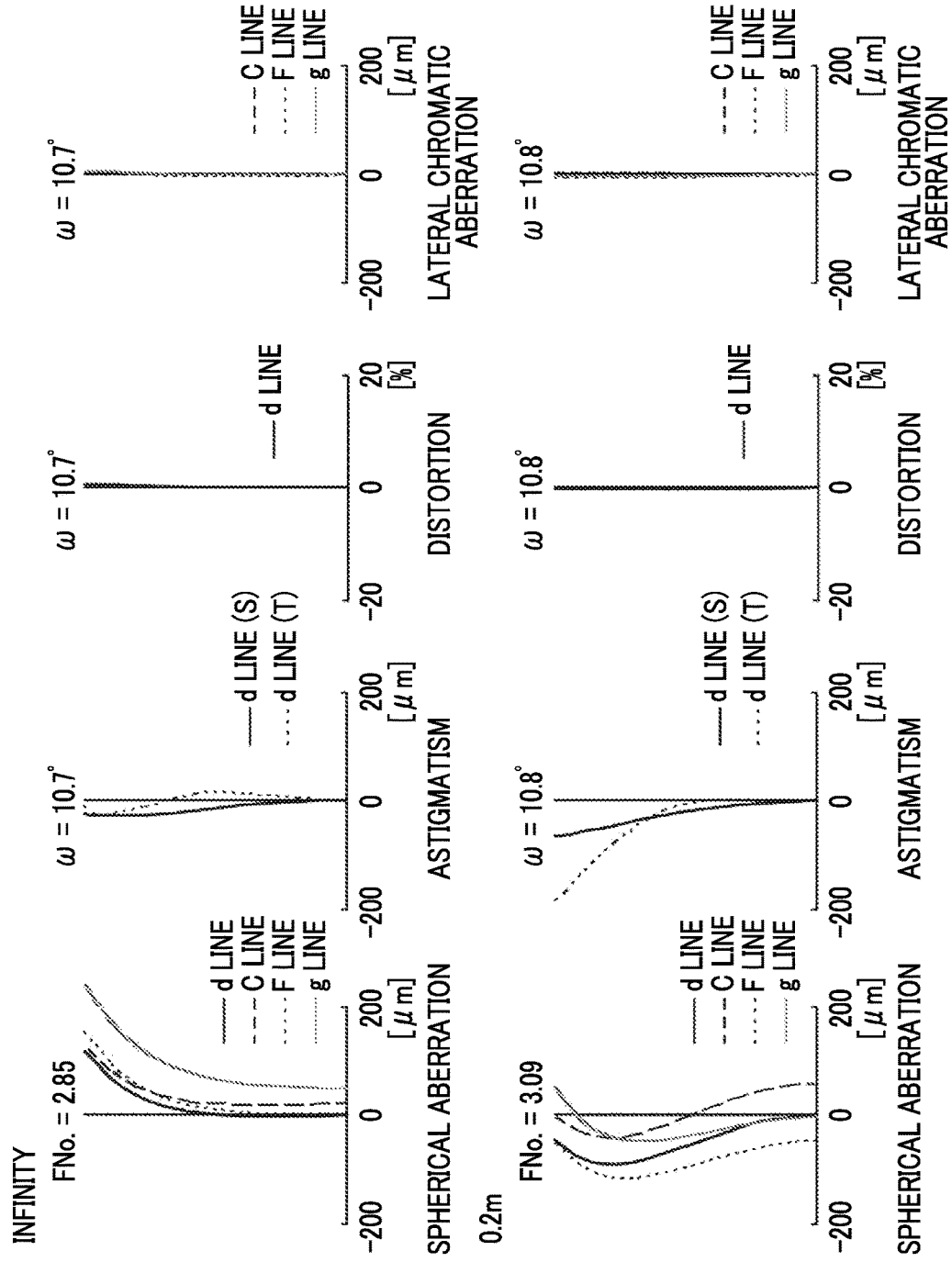
FIG. 16 is a diagram of aberrations of the imaging lens of Example 7 of the present invention.

FIG. 8 is a cross-sectional view of an imaging lens of Example 7. The imaging lens of Example 7 consists of, in order from the object side to the image side, a first lens group G1 having a positive refractive power and a second lens group G2 having a negative refractive power. During focusing from a distant object to a close-range object, the first lens group G1 remains stationary with respect to the image plane Sim, and the second lens group G2 moves toward the image side. The first lens group G1 consists of, in order from the object side to the image side, a first-a sub-lens group G1a, an aperture stop St, and a first-b sub-lens group G1b. The first-a sub-lens group G1a consists of three lenses La1 to La3 in order from the object side to the image side. The first-b sub-lens group G1b consists of four lenses Lb1 to Lb4 in order from the object side to the image side. The second lens group G2 consists of three lenses L21 to L23 in order from the object side to the image side. Table 13 shows basic lens data of the imaging lens of Example 7, Table 14 shows specification and variable surface distances, and FIG. 16 shows aberration diagrams thereof.

TABLE 13

Example 7

| Surface Number | R | D | Nd | vd |
|---|---|---|---|---|
| 1 | 34.19932 | 5.289 | 1.71833 | 32.38 |
| 2 | −1096.63098 | 0.200 | | |
| 3 | 20.75365 | 3.808 | 1.59522 | 67.73 |
| 4 | 34.84796 | 1.078 | 1.51999 | 64.23 |
| 5 | 11.96163 | 5.094 | | |
| 6 (St) | ∞ | 5.861 | | |
| 7 | −13.46203 | 3.719 | 1.77171 | 27.93 |
| 8 | 51.61499 | 6.010 | 1.59522 | 67.73 |
| 9 | −17.97847 | 3.024 | | |
| 10 | 25135.40670 | 6.000 | 1.80618 | 47.38 |
| 11 | −32.02550 | 0.200 | | |
| 12 | 30.89268 | 2.853 | 1.74995 | 53.01 |
| 13 | 325.22326 | DD[13] | | |
| 14 | 78.69690 | 1.000 | 1.98929 | 23.17 |
| 15 | 15.24617 | 4.344 | | |
| 16 | 54.18708 | 6.000 | 2.00001 | 15.00 |
| 17 | −335.09932 | 8.722 | | |
| 18 | −22.57582 | 6.000 | 1.80853 | 36.27 |
| 19 | −18.30600 | DD[19] | | |
| 20 | ∞ | 1.000 | 1.51680 | 64.20 |
| 21 | ∞ | 7.743 | | |

TABLE 14

Example 7

| | Infinity | 0.2 m |
|---|---|---|
| f | 48.509 | — |
| fnear | — | 48.113 |
| Bf | 18.402 | — |
| FNo. | 2.85 | 3.09 |
| 2ω (°) | 21.4 | 21.6 |
| DD[13] | 2.407 | 7.137 |
| DD[19] | 10.000 | 5.270 |

Table 15 shows values corresponding to Conditional Expressions (1) to (7) of the imaging lenses of Examples 1 to 7. In Examples 1 to 7, the d line is set as the reference wavelength. Table 15 shows the values on the d line basis.

TABLE 15

| Expression Number | Conditional Expression | Example 1 | Example 2 | Example 3 | Example 4 | Example 5 | Example 6 | Example 7 |
|---|---|---|---|---|---|---|---|---|
| (1) | sbH/f1b | 0.97 | 0.97 | 0.98 | 0.97 | 1.13 | 0.97 | 1.02 |
| (2) | f/f2 | 0.017 | 0.012 | 0.011 | 0.027 | 0.011 | 0.030 | −0.047 |
| (3) | h21/h22 | 0.570 | 0.537 | 0.546 | 0.547 | 0.485 | 0.542 | 0.557 |
| (4) | Ffsr/ds | 0.417 | 0.558 | 0.572 | 0.409 | 0.032 | 0.000 | 0.564 |
| (5) | Ff1b/ds | 0.435 | 0.573 | 0.586 | 0.450 | 0.487 | 0.000 | 0.505 |
| (6) | Bf/dsp | 1.294 | 1.596 | 1.510 | 1.485 | 1.245 | 1.985 | 1.680 |
| (7) | Bf1/d | 6.612 | 10.770 | 8.224 | 4.725 | 10.770 | 2.898 | 8.141 |

Next, an imaging apparatus according to an embodiment of the present invention will be described. FIG. 17 is a schematic configuration diagram of an imaging apparatus 10 using the imaging lens 1 according to the above-mentioned embodiment of the present invention as an example of an imaging apparatus of an embodiment of the present invention. As the imaging apparatus 10, for example, there is an FA camera, a MV camera, or a surveillance camera.

The imaging apparatus 10 comprises: the imaging lens 1; a filter 4 that is disposed on the image side of the imaging lens 1; an imaging element 5; a signal processing section 6 that performs processing of calculating a signal which is output from the imaging element 5, and a focus control section 7 that is for performing focusing of the imaging lens 1. FIG. 17 schematically shows the first lens group G1 and the second lens group G2 which are belonging to the imaging lens 1. The imaging element 5 captures an image of a subject, which is formed through the imaging lens 1, and converts the image into an electrical signal. For example, CCD, CMOS, or the like may be used. The imaging element 5 is disposed such that the imaging surface thereof is coplanar with the image plane of the imaging lens 1. Since the imaging apparatus 10 comprises the imaging lens 1 according to the embodiment of the present invention, fluctuation in imaging range caused by focusing is small, and a favorable image can be acquired regardless of the imaging distance.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens are not limited to the values shown in the numerical examples, and different values may be used therefor.

For example, in each example, the lens system, which performs focusing from the infinite distance object to the close-range object, is used. However, it is needless to say that the present invention can be applied to an imaging lens which performs focusing from a distant object at a finite distance to a close-range object.

The imaging apparatus according to the above-mentioned embodiment of the present invention is not limited to the above-mentioned examples, and may be modified into various forms such as a digital camera and an in-vehicle camera.

What is claimed is:

1. An imaging lens consisting of, in order from an object side to an image side:
   a first lens group that has a positive refractive power and remains stationary with respect to an image plane during focusing; and
   a second lens group that moves toward the image side during focusing from a distant object to a close-range object,
   wherein the first lens group has, successively in order from a position closest to the image side, a first-b sub-lens group having a positive refractive power and an aperture stop,
   wherein in a state where an object at infinity is in focus, assuming that
      sbH is a distance from the aperture stop to an object side principal point of the first-b sub-lens group,
      f1b is a focal length of the first-b sub-lens group,
      f is a focal length of the whole system, and
      f2 is a focal length of the second lens group,
   Conditional Expressions (1) and (2) are satisfied, $$0.5 < sbH/f1b < 1.5 \tag{1}$$

$$-0.2 < f/f2 < 0.2 \tag{2), and}$$

wherein in a state where the object at infinity is in focus, assuming that
      Ffsr is an air-converted distance on an optical axis from an object side focal point of a synthetic optical system, which is formed by combining the first-b sub-lens group and the second lens group, to a lens surface closest to the object side in the synthetic optical system, and
      ds is a distance on the optical axis from a lens surface closest to the aperture stop at a position closer to the object side than the aperture stop to a lens surface closest to the aperture stop at a position closer to the image side than the aperture stop in a system in which a lens is present to be closer to the object side than the aperture stop and is infinite in a system in a lens is not present to be closer to the object side than the aperture stop,
   Conditional Expression (4) is satisfied, $$0 \leq Ffsr/ds < 1 \tag{4}.$$

2. The imaging lens according to claim 1, wherein in a state where the object at infinity is in focus, assuming that
      h21 is a height of a paraxial on-axis ray at a lens surface closest to the object side in the second lens group, and
      h22 is a height of a paraxial on-axis ray at a lens surface closest to the image side in the second lens group,
   Conditional Expression (3) is satisfied, $$0.3 < h21/h22 < 0.8 \tag{3}.$$

3. An imaging lens consisting of, in order from an object side to an image side:
   a first lens group that has a positive refractive power and remains stationary with respect to an image plane during focusing; and
   a second lens group that moves toward the image side during focusing from a distant object to a close-range object,
   wherein the first lens group has, successively in order from a position closest to the image side, a first-b sub-lens group having a positive refractive power and an aperture stop,
   wherein in a state where an object at infinity is in focus, assuming that
      sbH is a distance from the aperture stop to an object side principal point of the first-b sub-lens group,
      f1b is a focal length of the first-b sub-lens group,
      f is a focal length of the whole system, and
      f2 is a focal length of the second lens group,
   Conditional Expressions (1) and (2) are satisfied, $$0.5 < sbH/f1b < 1.5 \tag{1}$$

$$-0.2 < f/f2 < 0.2 \tag{2), and}$$

wherein assuming that
      Ff1b is an air-converted distance on the optical axis from an object side focal point of the first-b sub-lens group to a lens surface closest to the object side in the first-b sub-lens group, and
      ds is a distance on the optical axis from a lens surface closest to the aperture stop at a position closer to the object side than the aperture stop to a lens surface closest to the aperture stop at a position closer to the image side than the aperture stop in a system in which a lens is present to be closer to the object side than the aperture stop and is infinite in a system in a lens is not present to be closer to the object side than the aperture stop,
   Conditional Expression (5) is satisfied, $$0 \leq Ff1b/ds < 1 \tag{5}.$$

4. An imaging lens consisting of, in order from an object side to an image side:
   a first lens group that has a positive refractive power and remains stationary with respect to an image plane during focusing; and
   a second lens group that moves toward the image side during focusing from a distant object to a close-range object,
   wherein the first lens group has, successively in order from a position closest to the image side, a first-b sub-lens group having a positive refractive power and an aperture stop,
   wherein in a state where an object at infinity is in focus, assuming that
      sbH is a distance from the aperture stop to an object side principal point of the first-b sub-lens group,
      f1b is a focal length of the first-b sub-lens group,
      f is a focal length of the whole system, and
      f2 is a focal length of the second lens group,
   Conditional Expressions (1) and (2) are satisfied, $$0.5 < sbH/f1b < 1.5 \tag{1}$$

$$-0.2 < f/f2 < 0.2 \tag{2), and}$$

wherein in a state where the object at infinity is in focus, assuming that
      Bf is a back focal length of the whole system at an air-converted distance, and
      dsp is a distance on the optical axis from a lens surface closest to the aperture stop at a position closer to the object side than the aperture stop to a lens surface closest to the aperture stop at a position closer to the image side than the aperture stop in a system in which a lens is present to be closer to the object side than the aperture stop, and is a distance on the optical axis from the aperture stop to a lens surface closest to the aperture stop at a position closer to the image side than the aperture stop in a system in which a lens is not present to be closer to the object side than the aperture stop, Conditional Expression (6) is satisfied, $$1 < Bf/dsp < 2 \quad (6).$$

5. The imaging lens according to claim 1, wherein in a state where the object at infinity is in focus, assuming that Bf1 is a back focal length of the first lens group at an air-converted distance, and d is a distance on the optical axis between the first lens group and the second lens group, Conditional Expression (7) is satisfied, $$1 < Bf1/d < 20 \quad (7).$$

6. The imaging lens according to claim 1, wherein Conditional Expression (1-1) is satisfied, $$0.8 < sbH/f1b < 1.2 \quad (1-1).$$

7. The imaging lens according to claim 1, wherein Conditional Expression (2-1) is satisfied, $$-0.1 < f/f2 < 0.1 \quad (2-1).$$

8. The imaging lens according to claim 2, wherein Conditional Expression (3-1) is satisfied, $$0.4 < h21/h22 < 0.6 \quad (3-1).$$

9. The imaging lens according to claim 1, wherein Conditional Expression (4-1) is satisfied, $$0 \leq Ffsr/ds < 0.6 \quad (4-1).$$

10. The imaging lens according to claim 3, wherein Conditional Expression (5-1) is satisfied, $$0 \leq Ff1b/ds < 0.6 \quad (5-1).$$

11. The imaging lens according to claim 5, wherein Conditional Expression (6-1) is satisfied, $$1.2 < Bf/dsp < 2 \quad (6-1).$$

12. The imaging lens according to claim 5, wherein Conditional Expression (7-1) is satisfied, $$2 < Bf1/d < 15 \quad (7-1).$$

13. An imaging apparatus comprising the imaging lens according to claim 1.

14. An imaging apparatus comprising the imaging lens according to claim 3.

15. An imaging apparatus comprising the imaging lens according to claim 4.

* * * * *